United States Patent [19]
Imamura et al.

[11] Patent Number: 5,893,896
[45] Date of Patent: Apr. 13, 1999

[54] APPARATUS AND METHOD FOR STABILITY CONTROLLING VEHICULAR ATTITUDE USING VEHICULAR BRAKING SYSTEM

[75] Inventors: Masamichi Imamura, Kanagawa; Shinji Katayose, Tokyo; Hitoshi Kubota, Kanagawa; Jun Kubo, Tokyo, all of Japan

[73] Assignee: Unisia Jecs Corporation, Atsugi, Japan

[21] Appl. No.: 08/865,869

[22] Filed: May 30, 1997

[30] Foreign Application Priority Data

May 31, 1996 [JP] Japan .................................. 8-139169

[51] Int. Cl.$^6$ .................................. G06F 7/70; G06F 19/00
[52] U.S. Cl. .................................. 701/70; 701/37; 701/41; 701/72; 701/78; 303/116.2; 303/146
[58] Field of Search .................................. 701/1, 37, 41, 701/70, 72, 78, 81, 83, 89; 303/116.2, 140, 146, 157, 158; 280/5.51, 767

[56] References Cited

U.S. PATENT DOCUMENTS

| | | | |
|---|---|---|---|
| 5,001,943 | 3/1991 | Fujita | 701/87 |
| 5,024,285 | 6/1991 | Fujita | 701/83 |
| 5,077,672 | 12/1991 | Nobumoto | 701/92 |
| 5,341,297 | 8/1994 | Zomotor . | |
| 5,563,793 | 10/1996 | Nakaura | 701/93 |
| 5,725,286 | 3/1998 | Sekiguchi | 303/115.4 |

FOREIGN PATENT DOCUMENTS

| | | |
|---|---|---|
| 41 23 235 | 11/1992 | Germany . |
| 44 37 701 | 4/1996 | Germany . |
| 6-247269 | 9/1994 | Japan . |
| 8-133039 | 5/1996 | Japan . |

Primary Examiner—William A. Cuchlinski, Jr.
Assistant Examiner—Gertrude Arthur
Attorney, Agent, or Firm—Foley & Lardner

[57] ABSTRACT

In apparatus and method for stability controlling a vehicular attitude for a vehicle, a slip angle (BETA) of a vehicle body to a vehicular forwarding direction is derived on the basis of a detected yaw rate, a derived vehicle body speed, and a detected lateral acceleration acted upon the vehicle body, a controller determines whether an oversteer condition occurs and/or determined whether an understeer condition occurs, and a braking liquid pressure from a control purpose liquid pressure source is supplied through one of two braking pressure distribution conduits so as to give a braking force to be applied to one of front left and right road wheels which is directed to suppress a yaw moment when the oversteer condition occurs. When the understeer condition occurs, the liquid pressure in the control purpose liquid pressure source is supplied to one of the two braking distribution conduits so as to give the braking force to be applied to one of the front left and right road wheels so as to develop the yaw moment.

21 Claims, 11 Drawing Sheets

5,893,896

1

APPARATUS AND METHOD FOR STABILITY CONTROLLING VEHICULAR ATTITUDE USING VEHICULAR BRAKING SYSTEM

BACKGROUND OF THE INVENTION

The present invention relates to apparatus and method for controlling a stability of a vehicular attitude using a vehicular braking system, particularly, the apparatus and method described above in which a braking force is controlled according to a variation in the vehicular attitude so as to stabilize the vehicular attitude.

A Japanese Patent Application First (unexamined) Publication No. Heisei 6-247269 published on Sep. 6, 1994 exemplifies a previously proposed vehicular attitude control apparatus.

In the above-identified Japanese Patent Application Publication, a vehicular attitude angle (β) is determined according to a yaw rate and a vehicular steering angle and, where the vehicular attitude angle (β) exceeds a limit value, a vehicular attitude purpose controller determines that it is a time to start the control and varies a wheel cylinder pressure in a vehicular braking system through a hydraulic pressure development equipment so that the attitude angle (β) is increased or such a situation that it is impossible for the attitude angle to be developed during a vehicular turning is avoided.

It is a general practice in a vehicle that vehicular braking pressure distribution conduits are of two mutually crossing types by which wheel cylinders arranged around from left and right road wheels are mutually connected and by which wheel cylinders arranged around front right road wheel and rear left road wheel are mutually connected and the two mutually crossing vehicular braking pressure distribution circuits are connected to a master cylinder (which serves to develop a braking operation responded liquid pressure).

If the above-described vehicular attitude control apparatus described in the above-identified Japanese Patent Application First Publication is applied to the braking system in which the two separate braking pressure distribution conduits are disposed, suppose that a liquid pressure from a control purpose liquid pressure source such as a pump is supplied to the wheel cylinders arranged around the front left and right road wheels or arranged around the same sided front and rear road wheels.

In this case, since the two braking pressure distribution conduits are interrupted from the master cylinder, suppose also that a vehicular driver operates a braking element to demand the braking during an execution of the vehicular attitude control.

In this case, since the two separate braking pressure distribution conduits are interrupted from the master cylinder, the liquid pressure developed in response to the braking demand by the driver is not supplied to the corresponding wheel cylinders. Consequently, the braking operated liquid pressure according to the driver's intention cannot be developed in the braking system.

To solve this problem, a force applied to the braking element to demand the braking or the liquid pressure in the master cylinder may be detected and the liquid pressure corresponding to the detected force or liquid pressure may be considered to be supplied to the corresponding wheel cylinders from the control purpose liquid pressure source. However, the above-described countermeasure introduces a complication of control and an expensive detector for detecting the force or liquid pressure in the master cylinder is needed. In addition, the complicated control and the complicated structure in the vehicular attitude control apparatus may be resulted in a reduction of reliability.

SUMMARY OF THE INVENTION

It is an object of the present invention to provide apparatus and method for controlling a stability of a vehicular attitude which can supply a brake demand operated liquid pressure developed in a master cylinder to which a brake element is connected to wheel cylinders according to a vehicle driver brake demand even during an execution of a vehicular attitude control according to the braking force so as to obtain the braking force according to the vehicle driver's intention without introductions of a control complexity, of a remarkable increase in a cost, and of a reduction of a reliability, and which can improve a control quality without a disturbance in the vehicular attitude control even if the vehicle driver operates a brake element to issue the brake demand during the execution of the vehicular attitude control.

The above-described object can be achieved by providing an apparatus for a vehicle, comprising: a braking system having a master cylinder, a plurality of wheel cylinders, each of the wheel cylinders being arranged around a corresponding one of front left and right road wheels and rear left and right road wheels so as to apply a braking force to the corresponding one of the front left and right and rear left and right road wheels according to a braking liquid pressure supplied thereto, and two separate braking liquid pressure distribution conduits which are so arranged and constructed as to distribute the braking liquid pressure developed in the master cylinder according to a brake demand to the wheel cylinders arranged around the front right and the rear left road wheels and to the wheel cylinders arranged around the front left and rear right road wheels, respectively; a control purpose liquid pressure source which is so arranged and constructed as to enable an increase in the liquid pressure applied to each wheel cylinder independently of the liquid pressure in the master cylinder developed according to the brake demand; a selector which is so arranged and constructed as to selectively output a liquid pressure supply to the respective wheel cylinders from either the master cylinder or the control purpose liquid pressure source; a vehicular behavior detector which is so arranged and constructed as to detect a vehicular behavior; and a controller, having a first determinator determining whether an oversteer of the vehicle exceeding a predetermined magnitude occurs on the basis of an inputted signal indicating the vehicular behavior from the vehicular behavior detector, said controller carrying out an oversteer avoidance control via the selector such that the liquid pressure in the control purpose liquid pressure source is supplied to one of the braking pressure distribution conduits through which a braking force is applied to one of the front road wheels via the corresponding one of the wheel cylinders in a direction toward which a yaw moment is suppressed and the liquid pressure in the master cylinder is supplied to the other of the braking pressure distribution conduits, when the first determinator determines that the oversteer of the vehicle exceeding the predetermined magnitude occurs, wherein the controller further comprises a second determinator arranged for determining whether an understeer of the vehicle exceeding a predetermined magnitude of the understeer occurs on the basis of the inputted signal from the vehicular behavior detector, the controller carrying out an understeer avoidance control via the selector such that the liquid pressure in the control purpose liquid pressure source is supplied to one of the braking liquid pressure distribution conduits through which the braking force is applied to one of the rear road wheels in a direction toward which the yaw moment is developed and the liquid pressure in the master cylinder is supplied to the other of the braking pressure distribution conduits, when the second determinator determines that the understeer of the vehicle exceeding the predetermined magnitude occurs, wherein said selector comprises first interrupting valves, interposed between the control purpose liquid pressure source and each of the two braking pressure distribution conduits, which is enabled to interrupt the supply of the liquid pressure in the control purpose liquid pressure source to the corresponding one of the two braking pressure distribution conduits, and second interrupting valves, interposed between the master cylinder and each of the two braking pressure distribution conduits, which is enabled to interrupt the supply of the liquid pressure in the master cylinder to the corresponding one of the two braking pressure distribution conduits and wherein said controller opens or closes each of the first and second interrupting valves during the oversteer or understeer avoidance control, wherein the vehicular behavior detector detects a yaw rate of the vehicle and wherein the first determinator determines whether the oversteer of the vehicle exceeding the predetermined magnitude occurs on the basis of the yaw rate and the second determinator determines whether the understeer of the vehicle occurs on the basis of the yaw rate, and wherein said controller further comprises a third determinator arranged for determining a slip angle of the vehicle on the basis of at least the yaw rate and wherein said first determinator determines whether the oversteer of the vehicle exceeding the predetermined magnitude occurs on the basis of the slip angle of the vehicle and said second determinator determined whether the understeer of the vehicle exceeding the predetermined magnitude occurs on the basis of the slip angle of the vehicle.

The above-described object can also be achieved by providing a method for stability controlling a vehicular attitude for a vehicle having front left and right and rear left and right road wheels (FL, FR, RL, and RR) and a brake system, the brake system including a master cylinder (14), a plurality of wheel cylinders, each of the wheel cylinders (20) being arranged around a corresponding one of the front left and right road wheels so as to apply a braking force to the corresponding one of the front left and right and rear left and right road wheels according to a braking liquid pressure applied thereto, two separate braking pressure distribution conduits (21, 22) which are so arrannged and constructed as to separately distribute a braking liquid pressure into the two of the wheel cylinders arranged around the front left and rear right road wheels and into the other two of the wheel cylinders arranged around the front left and rear right road wheels, respectively, and a control purpose liquid pressure source (13i) which is so arranged and constructed as to enable an increase in the liquid pressure to be applied to each wheel cylinder independently of the liquid pressure in the master cylinder, the method comprising the steps of: a) detecting each road wheel speed of the front left and right road wheels (FL, FR, RL, and RR); b) detecting a yaw rate (YAW) of the vehicle, c) deriving a lateral acceleration ($Y_G$) acted upon the vehicle; d) deriving a vehicle body speed (Vi) from the respective road wheel speeds; e) deriving a slip angle (BETA) of the vehicle body to a vehicular forwarding direction on the basis of the detected yaw rate (YAW), the detected lateral acceleration ($Y_G$), and the derived vehicle body speed (Vi); f) determining whether an oversteer exceeding a predetermined magnitude occurs on the basis of the determined slip angle; g) switching a selector (13e, 13f, 13g, and 13h), the selector being arranged for selectively outputting the liquid pressure from either the master cylinder or the control purpose liquid pressure source through one of the two braking pressure distribution conduits to the wheel cylinders so that the liquid pressure from the control purpose liquid pressure source is supplied to one of the braking pressure distribution conduits through which a front road wheel braking force is given to the wheel cylinder arranged around one of the front left and right road wheels in a direction such as to suppress a yaw moment when determining that the oversteer exceeding the predetermined magnitude occurs.

The above-described object can also be achieved by providing a method for stability controlling a vehicular attitude for a vehicle having front left and right and rear left and right road wheels (FL, FR, RL, and RR) and a brake system, the brake system including a master cylinder, a plurality of wheel cylinders, each of the wheel cylinders being arranged around a corresponding one of the front left and right road wheels so as to apply a braking force to the corresponding one of the front left and right and rear left and right road wheels according to a braking liquid pressure applied thereto, two separate braking pressure distribution conduits which are so arranged and constructed as to separately distribute a braking liquid pressure into the two of the wheel cylinders arranged around the front left and rear right road wheels and into the other two of the wheel cylinders arranged around the front left and rear right road wheels, respectively, and a control purpose liquid pressure source which is so arranged and constructed as to enable an increase in the liquid pressure to be applied to each wheel cylinder independently of the liquid pressure in the master cylinder, the method comprising the steps of: a) detecting each road wheel speed of the front left and right road wheels (FL, FR, RL, and RR); b) detecting a yaw rate (YAW) of the vehicle; c) deriving a lateral acceleration ($Y_G$) acted upon the vehicle; d) deriving a vehicle body speed (Vi) from the respective road wheel speeds; e) deriving a slip angle (BETA) of the vehicle body to a vehicular forwarding direction on the basis of the detected yaw rate (YAW), the detected lateral acceleration ($Y_G$), and the derived vehicle body speed (Vi); f) determining whether an understeer exceeding a predetermined magnitude occurs on the basis of the determined slip angle; g) switching a selector, the selector being arranged for selectively outputting the liquid pressure from either the master cylinder or the control purpose liquid pressure source through one of the two braking pressure distribution conduits to the wheel cylinders so that the liquid pressure from the control purpose liquid pressure source is supplied to one of the braking pressure distribution conduits through which a front road wheel braking force is given to the wheel cylinder arranged around one of the front left and right road wheels in a direction such as to develop a yaw moment when determining that the understeer exceeding the predetermined magnitude occurs.

BEST MODE FOR CARRYING OUT THE INVENTION

Reference will hereinafter be made to the drawings in order to facilitate a better understanding of the present invention.

Figure 2:
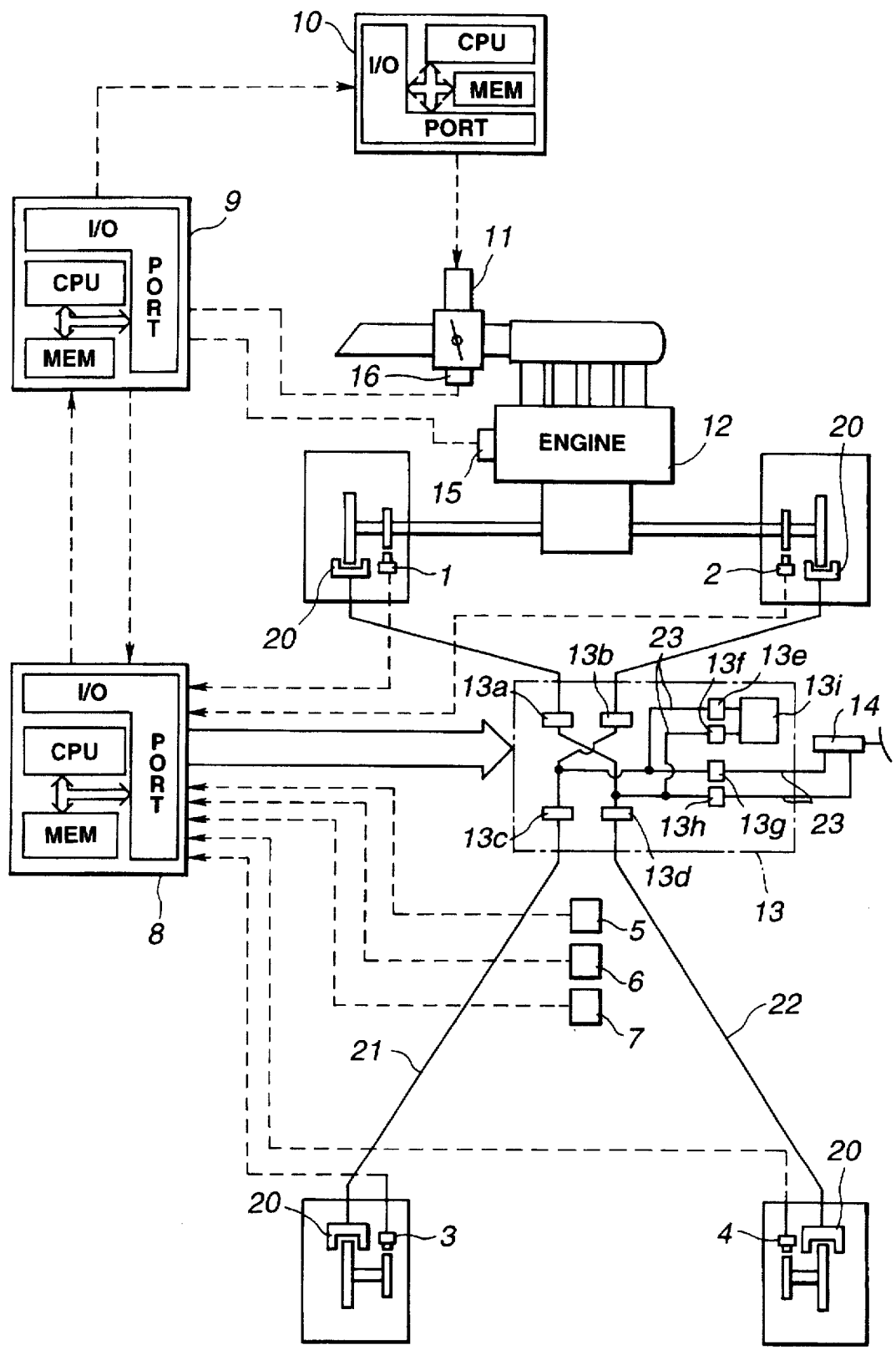
FIG. 2 is a control circuit block diagram of a preferred embodiment of the vehicular attitude stability controlling apparatus according to the present invention.
Figure 3:
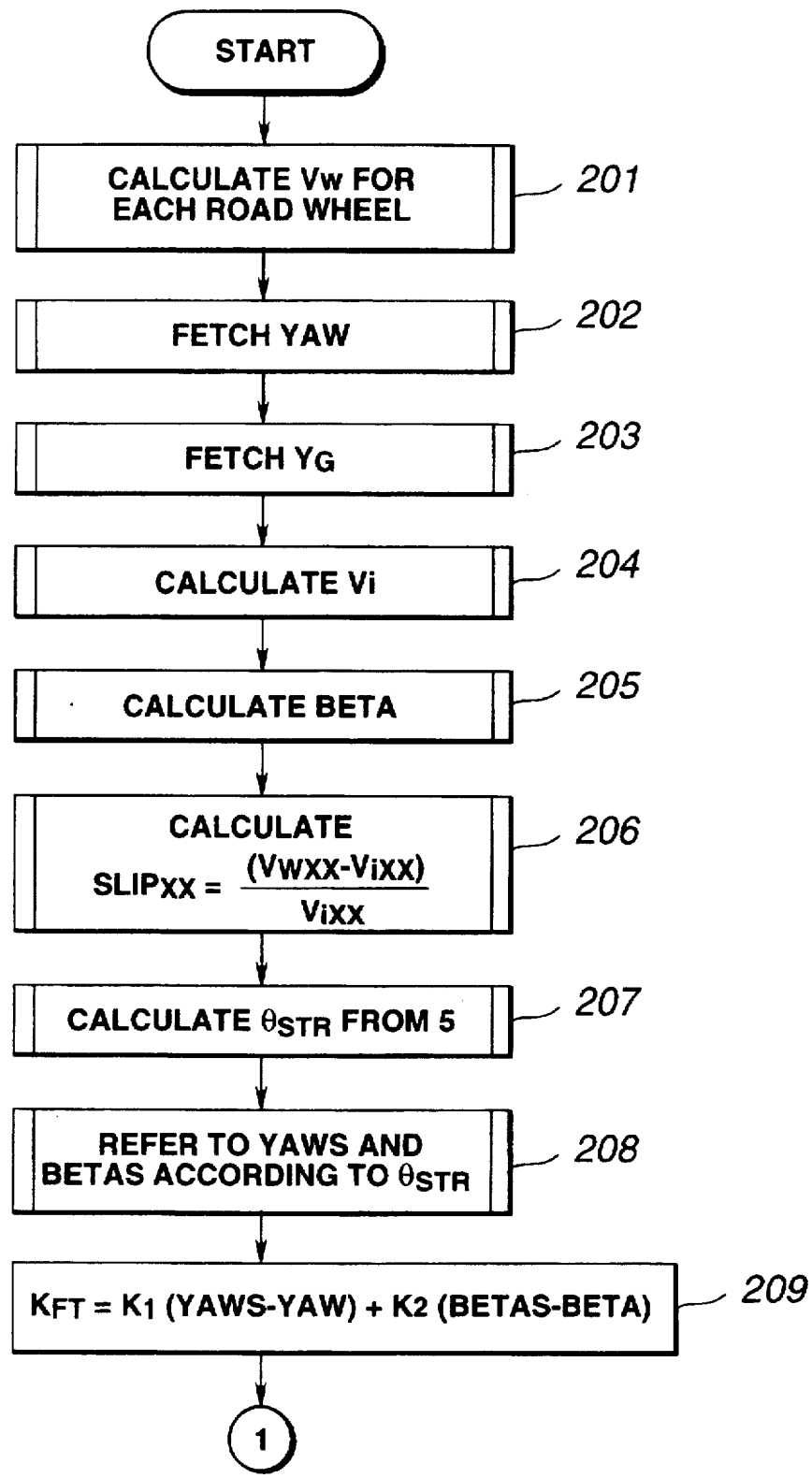
FIGS. 3, 4, 5, 6, 7, 8, 9, and 10 show integrally a flowchart executed by a controller of the vehicular attitude stability controlling apparatus shown in FIG. 2.

FIG. 2 shows a preferred embodiment of a vehicular stability controlling apparatus according to the present invention.

In FIG. 2, a plurality of road wheel speed sensors 1, 2, 3, and 4 are disposed on corresponding road wheel axles so as to detect road wheel speeds (VwFL, VwFR, VwRL, and VwRR) of front left and right road wheels and rear left and right road wheels (FR, FL, RL, and RR).

Each of the road wheel speed sensors 1, 2, 3, and 4 include a pick up coil and rotary encoder.

A steering angle sensor 5 is disposed on a vehicular steering system for detecting a steering angular velocity. It is noted that a controller 8 serves to receive a steering angular velocity signal from the steering angle sensor 5 and to derive a steering angular displacement through an integration of the steering angular velocity signal.

A yaw rate sensor 6 is disposed on a weight center of the vehicle for detecting a yaw rate of the vehicle, the yaw rate sensor being constituted by a tuning folk type strain gauge receiving a Coliolis force to detect the yaw rate.

A lateral acceleration sensor 7 (hereinafter, referred to as a lateral G sensor) includes, for example, a cantilever type strain gauge which receives a lateral force and detects a lateral acceleration acted upon a vehicle body.

A vehicular attitude controller 8 includes a microcomputer having an I/O Port, a CPU, a memory, and a common bus. The vehicular attitude controller 8 reads the vehicular attitude state on the basis of signals derived from the respective sensors 1 through 7 and controls each operation of valves 13a, 13b, 13c, 13d, 13e, 13f, 13g, and 13h installed in a brake oil pressure control actuator 13. Thus, a switching of a hydraulic pressure supply source to wheel cylinders 20 and a control of a braking liquid pressure to be supplied to each cylinder 20 are carried out to control a braking force to be applied to each road wheel RL, RR, FL, and FR.

The controller 8 calculates a required engine torque on the basis of each signal from each sensor 1 through 7 and transmits the required engine torque to an engine controller 9.

The braking hydraulic pressure actuator 13 carries out a supply of the braking liquid pressure and controls the supplied braking liquid pressure to the wheel cylinders arranged around the respective road wheels FL, FR, RL, and RR, respectively. As shown in FIG. 2, the barking hydraulic pressure actuator 13 is interposed in a midway through two crossing type braking pressure distribution conduits 21 and 22 and other braking pressure distribution conduits 23. That is to say, the braking pressure distribution conduits 21, 22, and 23 include: a braking pressure distribution conduit 21 connecting the two wheel cylinders 20 for the front right road wheel FR and the rear left road wheel RL; a braking pressure distribution conduit 22 connecting the remaining two wheel cylinders 20 for the front left road wheel FL and the rear right road wheel RR; and four braking distribution conduits 23 connecting a master cylinder 14 arranged for developing therein the liquid pressure in response to and according to a braking demand through a gas (accelerator) pedal by the vehicle driver and each distribution conduit 21 and 22 and connecting a control purpose liquid pressure source 13i to the other braking pressure distribution conduits 23.

The braking hydraulic pressure control actuator 13 includes: four control valves 13a through 13d disposed in a midway through the braking pressure distribution conduits 21 and 22 and arranged for independently controlling the braking liquid pressures to be supplied to the respective wheel cylinders 20; the control purpose hydraulic pressure (liquid pressure) source 13i which is so arranged as to enable an arbitrary liquid pressure rise according to a signal derived from the vehicular attitude controller 8; interrupting valves 13e (liquid pressure source side interrupting valve) and 13g (braking operation liquid pressure side interrupting valve), each of which switches a supply of the liquid pressure to each wheel cylinder 20 between the liquid pressure from the control purpose pressure source 13i and the liquid pressure developed in the master cylinder 14 according to he braking demand; and interrupting valves 13f (control purpose liquid pressure source interrupting valve) and 13g (braking demand operated liquid pressure source side interrupting valve) which switches the supply of the braking liquid pressure between the control purpose liquid pressure source interrupting valve 13i and the braking demand operated liquid pressure in the master cylinder 14.

Thus, the braking hydraulic pressure control actuator 13 controls the switch of the braking liquid pressure supply to the corresponding two wheel cylinders 20 through one of the two crossing type braking pressure distribution conduits 21 and 22 independently of the other of the two crossing type braking pressure distribution conduits 21 and 22 through the valves 20e through 20h and controls the braking liquid pressure on each wheel cylinder 20 through the control valves 20a to 20d.

It is noted that the interrupting valves 13g and 13h located in sides of the master cylinder 13 are normally open and the interrupting valves 13e and 13f located in the sides of the control purpose hydraulic pump 12i are normally closed in order for the braking demand operated liquid pressure developed in the master cylinder 14 to be transmitted to the respective braking pressure distribution conduits 21 and 22.

An engine revolution speed sensor 15 is constituted by a pick up coil and an encoder for detecting a revolution speed of an engine from a revolution state of an engine crankshaft. A throttle valve opening angle sensor 16 detects an opening angle of a throttle valve installed in an intake air passage 11 of the engine 12. Output signals from the engine revolution speed sensor 1 and the throttle valve opening angle sensor 16 are supplied to the engine controller 9 which receives the required engine torque request from the vehicular attitude controller 8. The engine controller 9 converts the required engine torque request into a corresponding required opening angle request of the throttle valve and outputs it to a throttle valve opening angle controller 10. The throttle valve opening angle controller 10 supplies a motor drive current which corresponds to the required throttle valve opening angle request to a throttle actuator 11 attached in the engine 12 to control an engine torque. Thus, the vehicular attitude is detected by means of the sensors 1 to 7, 15 and 16 and the whole road wheel torque is controlled by varying the braking force applied to each road wheel and the braking liquid pressure to each wheel cylinder 20.

Next, FIGS. 3, 4, 5, 6, 7, 8, 9, and 10 show intergrally an operational flowchart of the vehicular attitude stability controlling apparatus in the embodiment shown in FIG. 2.

It is noted that each controller 8, 9, and 10 is constituted by the microcomputer.

The routine shown in FIG. 4 through FIG. 10 is executed whenever a predetermined period of time has passed.

First, at a step 201, the CPU of the vehicular attitude Controller 8 calculates the road wheel speed Vw of each road wheel from the detected road wheel speed signals of the respective road wheel speed sensors 1 to 4 as VwFL, VwFR, VwRL, and VwRR.

At the next steps 202 and 203, the CPU of the vehicular attitude controller 8 calculates a yaw rate YAW and a lateral G (acceleration) on the basis of the detected signals of the yaw rate sensor 6 and the lateral G sensor 7.

At the next step 204, the CPU of the vehicular attitude controller 8 calculates a vehicle body speed Vi from among the calculated road wheel speed values Vwxx (xx denotes each of FL, FR, RL, and RR). For example, Vi=MAX (Vwxx), i.e., a maximum value of the road wheel speeds is the vehicle body speed Vi.

At the next step 205, the CPU of the vehicular attitude controller 8 calculates a vehicle body slip angle BETA as follows: BETA= ((1/Vi) $Y_G$+YAW)dt.

At the next step 206, the CPU of the controller 8 calculates a slip rate $SLIP_{FL}$, $SLIP_{FR}$, $SLIP_{RL}$, and $SLIP_{RR}$ of each road wheel using the following equation (1).

$$SLIPxx=(Vwxx-Vixx)/Vixx \qquad (1),$$

wherein xx denotes each of FL, FR, RL, and RR.

At the next step 207, the CPU of the controller 8 calculates a steering angular displacement from a steering angular velocity signal of the steering angle sensor 5 through, for example, an integration.

At the next step 208, the CPU of the vehicular controller 8 refers to a target value of the yaw rate (YAWS) and a target value of the vehicle body slip angle (BETAS) on the basis of the steering angular displacement θSTR and the vehicle body speed Vi using a table look up technique from a table stored in the memory of the controller 8.

At the next step 209, the CPU of the controller 8 calculates an index $K_{FT}$ for correcting the vehicular attitude as follows: $K_{FT}=k_1$(YAWS−YAW)+$k_2$(BETAS−BETA), wherein $k_1$ and $k_2$ denote predetermined control gains.

Figure 5:
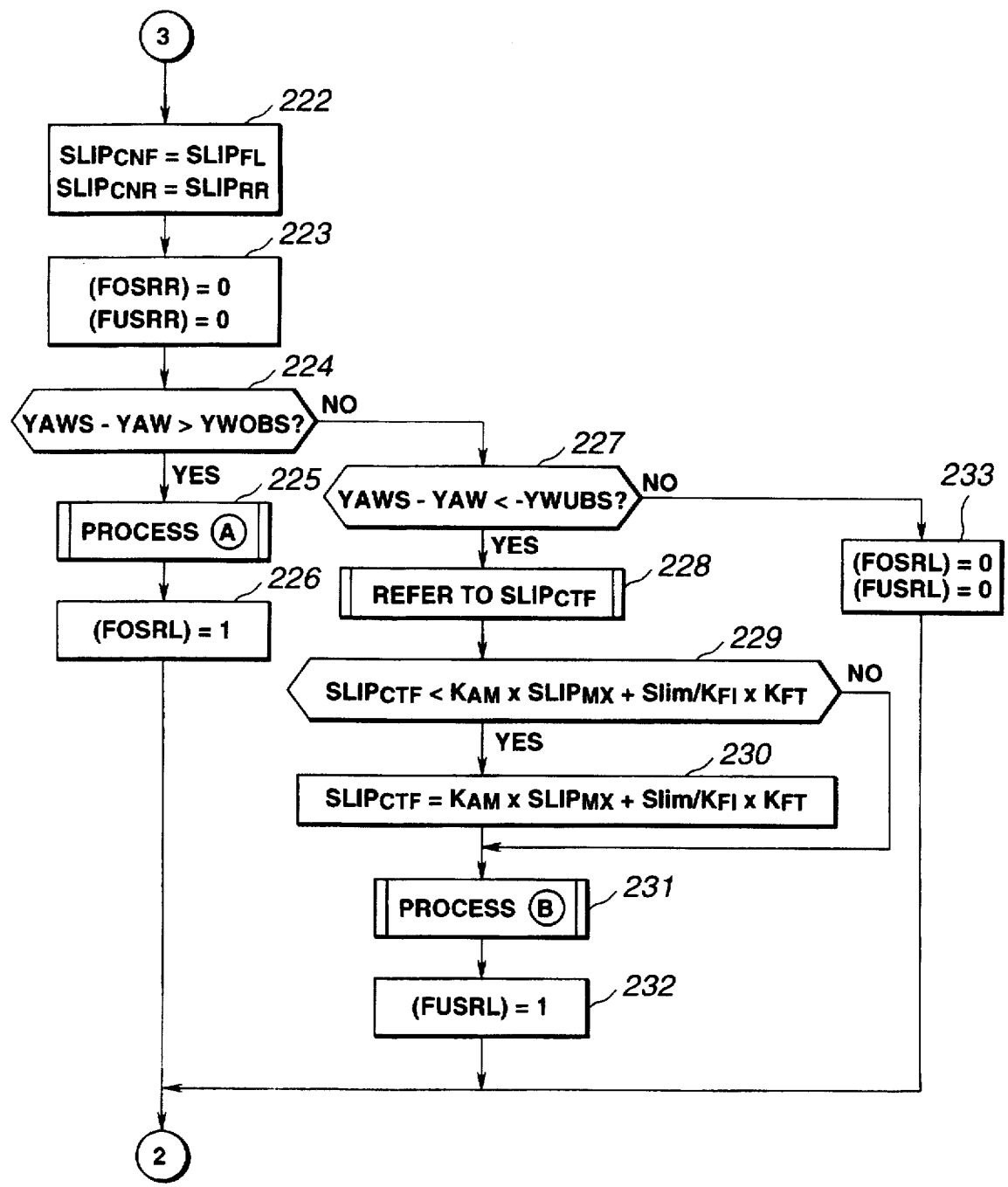

Next, FIG. 5 shows a part of the routine in which during a right turning of the vehicle, a slip rate target value $SLIP_{CTF}$ and front and rear slip rate limit values $SLIP_{CGR}$ and $SLIP_{CGF}$ are determined.

At a step 210, the CPU of the vehicular controller 8 determines whether the vehicle is turning in a rightward direction or a leftward direction as viewed over a top of the vehicle on the basis of the detected yaw rate YAW or the calculated steering angular displacement θSTR.

If the vehicle is turning in the rightward direction (YES) at the step 210, the routine goes to a step 211. If the vehicle is turning in the leftward direction (NO) at the step 210, the routine goes to a step 222 of FIG. 6.

At the step 211, the CPU of the controller 8 selects one 21 of the two separate braking pressure distribution conduits 21 and 22 connected to the wheel cylinders 20 arranged around the front right and the rear left road wheels and through which the liquid pressure in the master cylinder 14 is supplied and calculates slip rates of the front right and rear left road wheels FR and RL in the corresponding braking pressure distribution conduit system as follows:

$SLIP_{CnF}=SLIP_{FR}$, and $SLIP_{CnR}=SLIP_{RL}$.

A the next step 212, both of a left turn oversteer status flag FOSRL and a left turn understeer status flag FUSRL are cleared to zero.

At the step 213, the CPU of the controller 8 determines whether the present vehicular attitude falls under a right turn oversteer condition. In this embodiment, the yaw rate at the right turn is positive. That is to say, at the step 213, the CPU determines whether YAW−YAW<−YWOBS, i.e., a subtraction of the yaw rate (absolute value) YAW from the target value of the yaw rate YAWS is smaller than a set value of the oversteer condition −YWOBS.

If YAWS−YAW<−YWOBS (YES) at the step 213, the CPU of the vehicular attitude controller 8 determines that the present vehicular attitude falls under the oversteer condition and the routine goes to a step 214. If NO at the step 213 (YAWS−YAW≧−YWOBS), the routine goes to a step 216 since no oversteer condition occurs.

In this embodiment, during the right turn of the vehicle, a development of the yaw rate absolute value means an occurrence of the oversteer.

At the step 214, the process (A) as described below is carried out.

At the process (A), the CPU of the controller 8 calculates the target value $SLIP_{CTF}$ of the slip rate of one of the front left and right road wheels whose wheel cylinder 20 is connected to the corresponding one 22 of the braking pressure distribution conduits 21 and 22 through which the liquid pressure from the hydraulic pressure pump 13i is supplied (called, a braking control conduit system) using the following equation and calculates slip rate limit values $SLIP_{CGF}$ and $SLIP_{CGR}$ of the front and rear road wheels whose wheel cylinders 20 are connected to the other 21 of the braking pressure distribution conduits through which the liquid pressure in the master cylinder 14 is supplied using the following equation.

$SLIP_{CTF}=SLIP_{CnF}-K_{FM}\times SLIP_{CnR}+(Slim/K_{FT})\times K_{FT}$, and $SLIP_{CGF}=SLIP_{CGR}-(K_{FT}\times SLIP_{MX}-Slim\times K_{FT})/(K_{FT}-K_{RI})$.

As the yaw rate deviation or the slip angle deviation is large, the slip rate $SLIP_{CTR}$ of one of the rear road wheels whose wheel cylinder 20 is connected to one of the two braking pressure distribution conduits 21 and 22 through which the liquid pressure from the hydraulic pressure pump 13i is supplied is set larger so that the braking force is strongly acted upon and the slip rates SLIPCGF and SLIPCGR receive limitations on the braking forces so as not to unbalance the vehicular attitude control on the corresponding front and rear road wheels in the braking control conduit system.

At the next step 221, the CPU of the controller 8 sets the right turn understeer status flag FUSRR to "1" in order to store the present vehicular attitude into the memory thereof.

It is noted that when neither condition of the step 213 nor of the step 216 is satisfied, the CPU of the controller 8 determines that the present vehicular attitude falls in the right turn neutral state and the routine goes to a step 222 in which both of the right turn oversteer status flag FOSRR and the right turn understeer status flag FUSRR are cleared.

Figure 4:
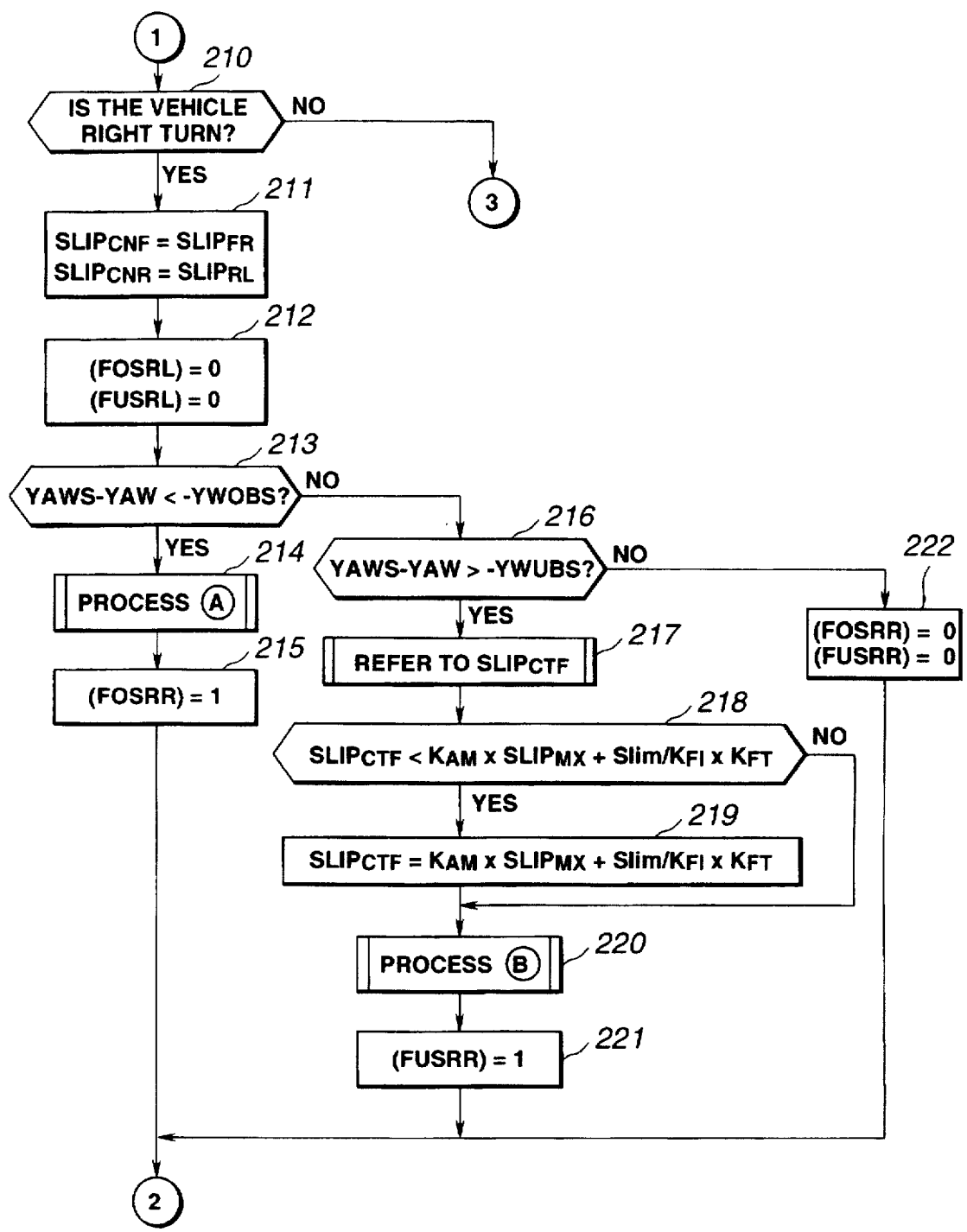

FIG. 5 shows a part of the routine flowing when the CPU of the controller 8 determines that the vehicle is turning in the leftward direction at the step 210 of FIG. 4.

When the vehicle is turning in the leftward direction, one of the two separate braking pressure distribution conduits 21 serves as the control braking conduit system and the other thereof 22 serves as the distribution conduit thereof through which the liquid pressure from the master cylinder 14 is supplied.

It is noted that although a sign of each set value and each signal is different from that in the case of the right turn shown in FIG. 4, the contents of steps are generally the same as those in FIG. 4.

At a step 222, the CPU of the controller 8 sets as follows: $SLIP_{C_nF}=SLIP_{FL}$, $SLIP_{C_nR}=SLIP_{RR}$.

At a step 223, the CPU of the controller 8 clears the flags as follows: FOSRR=0 and FUSRR 32 0.

At a step 224, the CPU of the controller 8 determines whether YAWS−YAW>YWOBS.

At a step 227, the CPU of the controller 8 determines whether YAWS−YAW<−YWUBS.

At a step 225, the process of (A) is carried out in the same manner as the step 214.

At a step 226, (FOSRL)=1.

At a step 228, $SLIP_{CTF}$ is derived in the same manner as the step 217.

At the next steps 229 and 230, the same series of processing as the steps 218 and 219 is carried out.

At a step 231, the process of (B) is carried out in the same manner as the step 220.

At a step 232, (FUSRL)=1.

At a step 233, (FOSRL)=0 and (FUSRL)=0.

Figure 6:
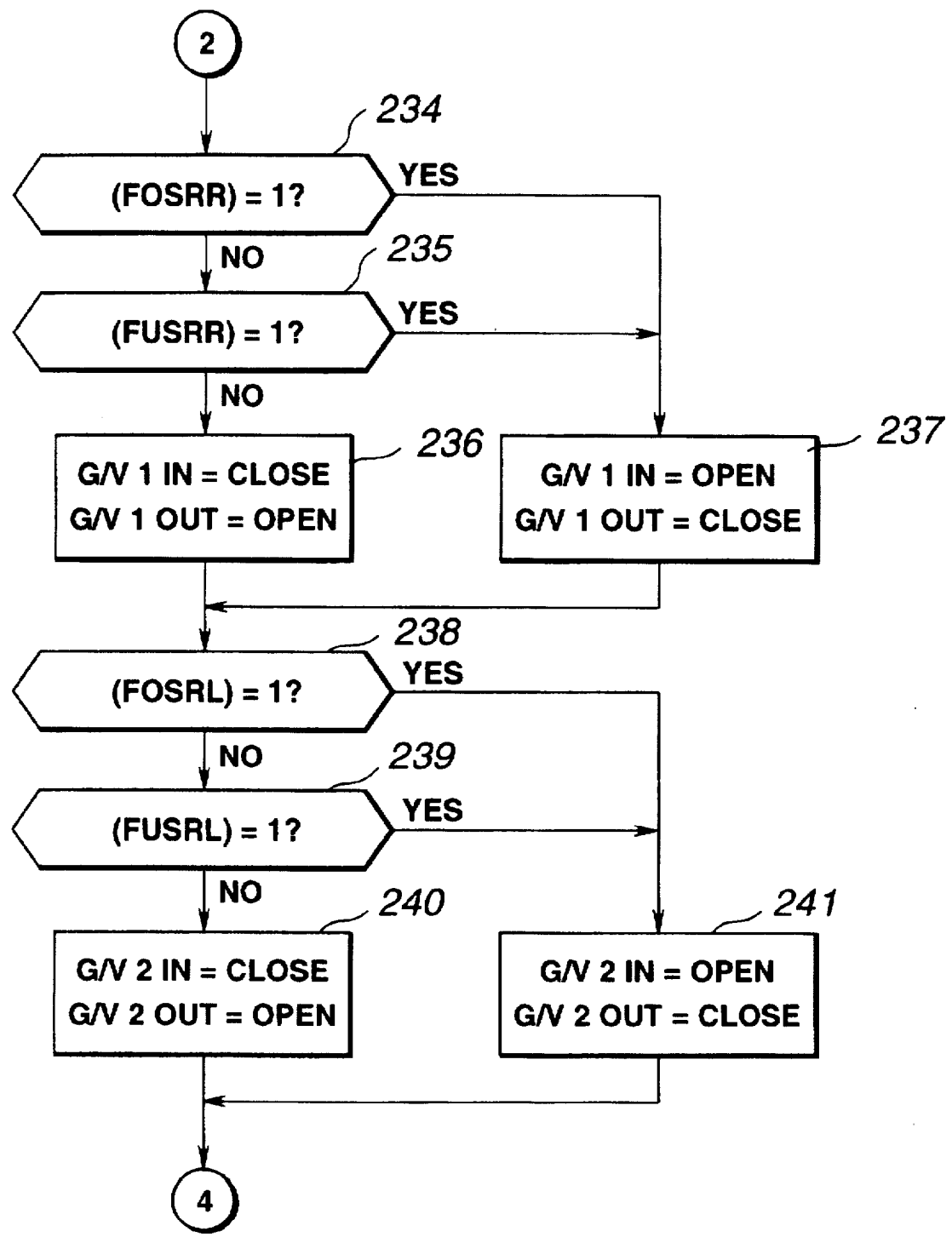

FIG. 6 shows a part of the routine in which a switching of the liquid pressure supply toward both of the two separate braking pressure conduits 21 and 22 between the hydraulic pressure pump 13i and the master cylinder 14 is determined.

The routine of FIG. 6 is derived from the steps 226, 232, and 222.

At a step 234, the CPU of the controller 8 confirms whether (FOSRR)=1.

At a step 235, the CPU of the controller 8 confirms whether (FUSRR)=1.

If either of steps 234 or 23 indicates YES, the routine goes to a step 237 in which the liquid pressure supply of one of the two braking pressure distribution conduits related to the front left and rear right road wheels is switched to the hydraulic pressure pump 13i in order to apply the braking force to the front left road wheel so as to cancel on oversteer moment when (FOSRR)=1 and in order to apply the braking force to the rear right road wheel when (FUSRR)=1 so as to develop the oversteer moment with the interrupting valve 13f opened and the interrupting valve 13h closed.

If neither (FOSRR) nor (FUSRR) is 1 (NO at the steps 234 and 235, the routine goes to a step 236 since no control over the right turn is carried out.

At the step 236, the CPU of the controller 8 closes the control valve 13f and opens the interrupting valve 13h in order to switch the hydraulic pressure supply toward one of the twop separate braking pressure distribution conduits 22 to the master cylinder 14.

At the next step 238, the CPU of the controller 8 checks to see whether the left turn oversteer status flag FOSRL is set to 1 {(FOSRL)=1}. If YES at the step 238, the routine goes to a step 241. If NO at the step 238, the routine goes to a step 239.

At the step 239, the CPU of the controller 8 determines whether the left turn understeer status flag FUSRL is set to 1 {(FUSRL)=1}.

If FUSRL=1 (YES) at the step 238, the routine goes to the step 241.

At the step 241, the CPU of the controller 8 issues commands to open the control valve 13e and to close the control valve 13g in order to switch the hydraulic pressure supply toward one of the two separate braking pressure distribution conduits 21 related to the front right and rear left road wheels to the hydraulic pressure pump 13i.

If neither FOSRL nor FUSRL is 1 (NO at the steps 238 and 239), the routine goes to a step 240 in which the CPU of the controller 8 issues a command to close the control valve 13e and open the control valve 13g so that the hydraulic pressure supply to the one 21 of the braking pressure distribution conduits 21 and 22 is switched to the master cylinder 14.

Hence, during the execution of a yaw moment control (vehicular attitude control) at the steps 234 through 241, the hydraulic pressure supply to one of the two separate braking pressure distribution conduits 21 and 22 is switched to the bydraulic pressure supply 13i and that to the other thereof is switched to the master cylinder 14.

Then, when the vehicle driver operates the braking element, the braking demand operated liquid pressure developed in the master cylinder 14 is supplied via at least one of the two braking pressure distribution conduits to the wheel cylinders 20 connected thereto.

Figure 7:
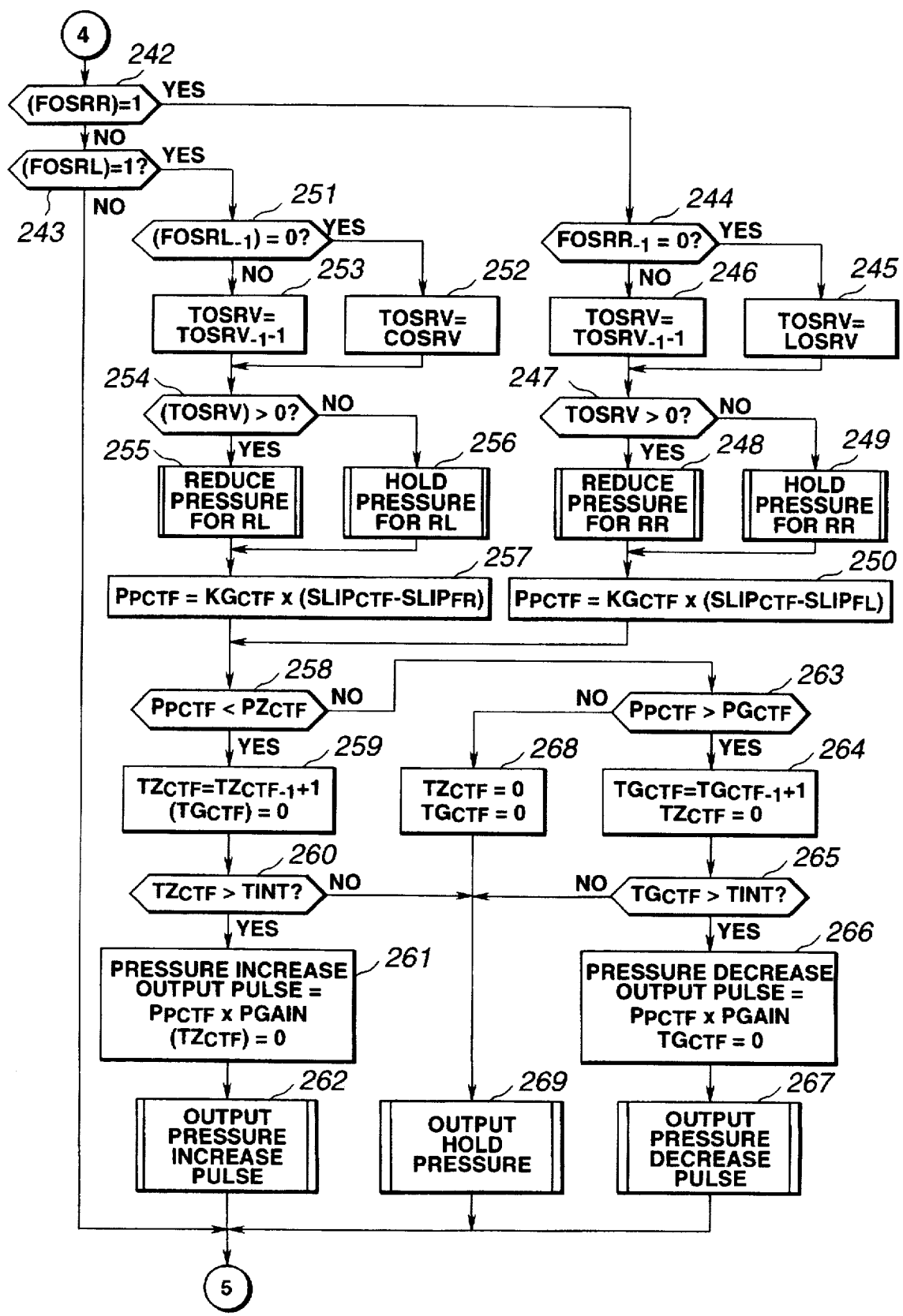

FIG. 7 shows the braking liquid pressure control in the control conduit system when the vehicular attitude falls under the oversteer condition.

At a step 242, the CPU of the controller 8 determines whether (FOSRR)=1.

At the next step 243, the CPU of the controller 8 determines whether the left turn oversteer status flag (FOSRL)=1. If the right turn oversteer status flag is 1 (FOSRR)=1 at the step 242 (YES), the routine goes to a step 244.

At the step 244, the CPU of the controller 8 determines whether a previous value ($FOSRR_{-1}$) at the right turn oversteer status flag FOSRR is referred to in order to determine whether the present routine is the first time for the right turn oversteer condition to be determined.

If $FOSRR_{-1}$ is 0 ($FOSRR_{-1}$=0) (YES) at the step 244, the routine goes to a step 24 in which TOSRV=LOSRV.

If FOSRR−1=1 (NO) at the step 244 (NO), the routine goes to a step 246 in which TOSRV=$TOSRV_{-1}$−1.

TOSRV denotes a braking pressure decrement counter and LOSRV denotes a set value from which the counter TOSRV is decremented.

At a step 247, the CPU of the controller 8 determines whether TOSRV>0.

If it is not the first time (NO at the step 246), the routine goes to the step 246 in which TOSRV=$TOSRV_{-1}$−1.

If TOSRV>0 at the step 247 (YES), the CPU of the controller 8 issues a command to the hydraulic control valve 13d so as to reduce the braking liquid pressure passing threrethrough at a step 248. If TOSRV $\geq$ 0 (NO) at the step 247, a hold signal is issued to the hydraulic pressure control valve 13d for the rear right road wheel RR so as to hold the braking liquid pressure thereat at a step 249.

When the hydraulic pressure supply toward the corresponding one of the two separate braking pressure distribution conduits 22 is switched to the hydraulic pressure pump 13i, the hydraulic pressure in the corresponding one of the wheel cylinders 20 which is arranged around the rear right road wheel RR is decreased for a predetermined time duration COSRV so as to be drained sufficiently (the hydraulic pressure indicates zero) and, thereafter, the hydraulic pressure is held at zero.

At a step 250, the CPU of the controller 8 calculates a front road wheel controlled hydraulic pressure required value $P_{PCTF}$ as follows: $P_{PCTF}=KG_{CTF}\times(SLIP_{CTF}-SLIP_{FL})$, wherein $KG_{CTF}$ denotes a predetermined control gain, $SLIP_{CTF}$ is the target value of the slip rate on the front road wheel, and $SLIP_{FL}$ is the slip rate of the front left road wheel.

Steps 251 through 256 are the vehicular attitude control when (FOSRL)=1 at the step 243 (the left turn ocersteer status) and the same control procedure as the steps 244 through 250 is advanced provided that the position of the corresponding one of the rear road wheels is different from that of the other rear road wheel (RR→RL).

That is to say, together with the hold of the zeroed hydraulic pressure in the wheel cylinder 20 at the rear left road wheel RL, the control hydraulic pressure requested value PPCTF on the front left road wheel is calculated on the basis of the front right road wheel slip rate target value $SLIP_{CTF}$ and the slip rate $SLIP_{FL}$.

The steps 258 through 269 indicate a procedure in which each hydraulic pressure control valves 13a and 13b is actuated on the basis of the front road wheel hydraulic pressure required value $P_{PCTF}$ calculated at either the step 250 or step 257. At a step 258, the CPU of the controller 8 determines whether the control hydraulic pressure requested value $P_{PCTF}$ is below a predetermined pressure increment threshold value $PZ_{CTF}$ ($P_{PCTF}<PZ_{CTF}$).

If $P_{PCTF}<PZ_{CTF}$ (at the step 258) (YES) at the step 258, the CPU of the controller 8 determines that since the target value of the slip rate on the front road wheels is smaller than either SLIPFL or SLIPFR, a further braking force is requested to apply and the routine goes to a step 259 in which a braking pressure interval counter $TZCTF$ or a braking pressure interval counter TGCTF is reset.

At a step 260, the CPU of the controller 8 determines if the braking pressure interval counter $TZ_{CTF}$ exceeds a predetermined interval of time TINT($TZ_{CTF}$>TINT). If YES, namely, $TZ_{CTF}$>TINT at the step 260, the routine goes to a step 261. If NO, namely, $TZ_{CTF} \leq$ TINT at the step 260, the routine goes to a step 269. At the step 269, the liquid pressure at the corresponding wheel cylinder 20 is held as it is required.

At the step 261, the CPU of the controller 8 calculates a braking liquid pressure increase (increment) output pulse from the control hydraulic required value $P_{PCTF}$ multiplied by a pulse conversion coefficient PGAIN and clears the pressure increment interval counter $TZ_{CTF}$.

Thereafter, the routine goes to a step 262 in which the hydraulic pressure control valve 13a connected to one of the wheel cylinders 20 which is arranged around the front left road wheel is actuated by the pressure increase pulse calculated at the step 261 when FOSRR=1. In the case wherein FOSRL=1, the hydraulic pressure control valve 13b connected to the front right road wheel is actuated when the left turn oversteer status occurs (FOSRL=1).

If NO at the step 260, the routine goes to a step 269 since the CPU of the controller 8 determines that no pressure increase request is issued. At the step 269, the CPU of the controller 8 operates the hydraulic pressure control valve 13a or 13b so that the hydraulic pressure in the corresponding one of the wheel cylinders 20 is held as it is required.

On the other hand, steps 263 through 267 are part of the routine in which the decrease of the hydraulic pressure in the corresponding one of the wheel cylinders 20 is carried out.

If neither $P_{PCTF}<PZ_{CTF}$ nor $P_{PCTF}>PG_{CTF}$ at a step 258 or at a step 263 (NO at both steps of 258 and 263), the routine goes to a step 268 since the slip rate $SLIP_{FL}$ or $SLIP_{FR}$ is placed near the target value of the slip rate $SLIP_{CTF}$ and there is no request of pressure increase or decrease. Then, the routine goes to a step 268 in which both pressure increase interval counters TZCTF and pressure decrease interval counter TGCTF are cleared to zero (TZCTF=0, TGCTF=0).

Then, the routine goes to a step 269 in which the liquid pressures in the corresponding wheel cylinders 20 are held as they are requested.

When a control at the steps 242 through 269 causes the determination of the CPU of the controller 8 that the oversteer condition occurs, the liquid pressure (the hydraulic pressure) in one of the wheel cylinders (the hydraulic pressure) in one of the wheel cylinders 20 arranged around the corresponding one of the rear left and right road wheels which is connected to the control braking pressure distribution conduit system from among the two braking pressure distribution conduits 21 and 22 is zeroed and the braking liquid pressure applied through one of the braking liquid pressure distribution conduits 21 and 22 which is the control braking liquid pressure distribution conduit system to the corresponding one of the wheel cylinders arranged around one of the front left and right road wheels connected to the above-described wheel cylinder is controlled so that the corresponding front road wheel slip rate is converged to the target value $SLIP_{CTF}$ of the slip rate.

During the oversteer condition, the braking force applied to the corresponding front road wheel causes the oversteer moment to be decreased and the hydraulic pressure in the corresponding wheel cylinder arranged around the corresponding rear road wheel is zero so that each of the road wheel speeds becomes remarkably coincident to the vehicle body speed and an estimation of the vehicle body speed with a high accuracy can be achieved.

Figure 8:
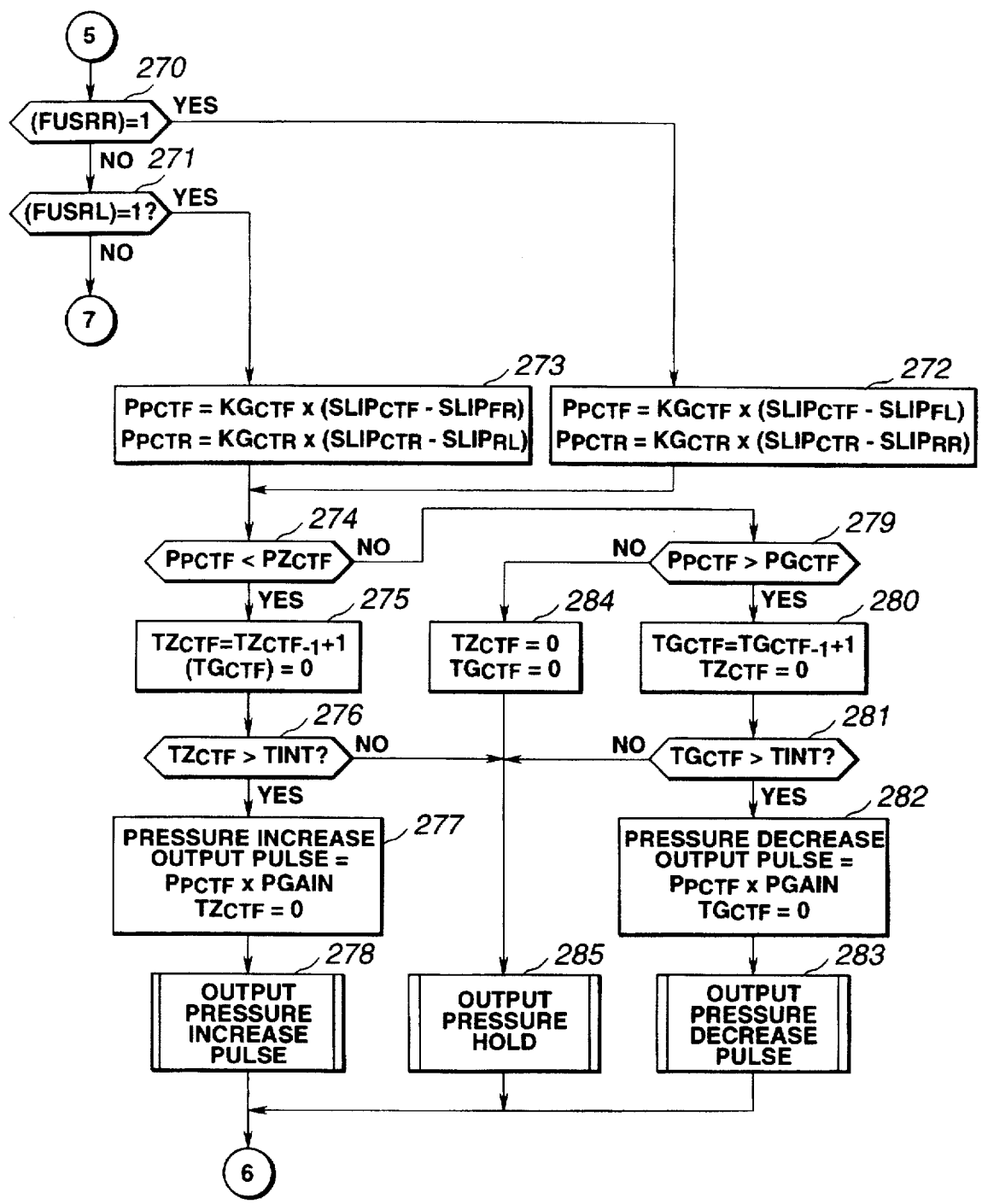
Figure 9:
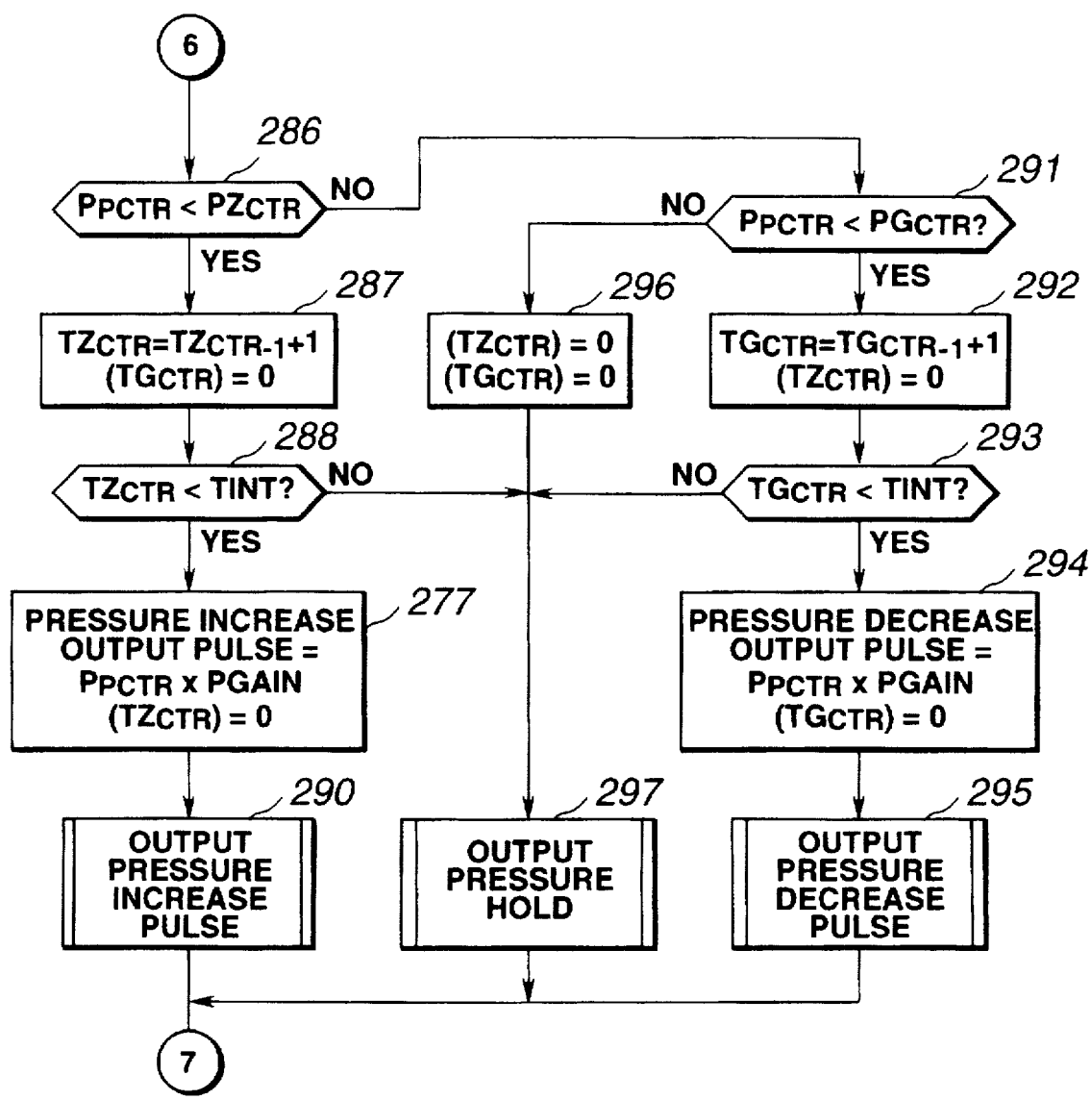

FIGS. 8 and 9 integrally show a braking hydraulic control in one of the two separate braking pressure distribution conduits through which the liquid pressure from the master cylinder 14 is supplied during the determination that the understeer condition occurs.

In details, at a step 270, the CPU of the controller 8 determines whether (FUSRR)=1. If YES at the step 270, the routine goes to a step 272 since the right turn understeer condition has occurred. If NO at the step 270, the routine goes to a step 271. At the step 271, the CPU of the controller 8 determines whether (FUSRL)=1.

If YES at the step 271, the routine goes to a step 273 since the left turn understeer condition has occurred.

At the step 272, the CPU of the controller 8 calculates the control hydraulic pressure required value $P_{PCTF}$ by deriving a difference between the target value of the slip rate $SLIP_{CTF}$ on the one of the front left and right road wheels which is associated with the control braking pressure conduit system and the slip rate of the front left road wheel $SLIP_{FL}$ and by multiplying the difference by the control gain $KG_{CTF}$ and calculates the rear road wheel control hydraulic pressure required value $P_{PCTR}$ by deriving a difference between the target value of the slip rate $SLIP_{CTR}$ on the one of the rear left and right road wheels which is associated with the control braking pressure conduit system and the slip rate of the rear right road wheel $SLIP_{RR}$ and by multiplying the difference by the control gain $KG_{CTR}$ as follows:

$$P_{PCTF}=KG_{CTF} \times (SLIP_{CTF}-SLIP_{FL}); \text{ and}$$

$$P_{PCTR}=KG_{CTR} \times (SLIP_{CTR}-SLIP_{RR}).$$

At the step 273, the CPU of the controller 8 calculates the front and rear control hydraulic pressure required values $P_{PCTF}$ and $P_{PCTR}$ from the target values of the slip rate $SLIP_{CTF}$ and $SLIP_{CTR}$, the slip rates of the front right road wheel and of the rear left road wheel $SLIP_{FR}$ and $SLIP_{RL}$, and the control gain $KG_{CTF}$ and $KG_{CTR}$ as follows:

$$P_{PCTF}=KG_{CTF} \times (SLIP_{CTF}-SLIP_{FR}); \text{ and}$$

$$P_{PCTR}=KG_{CTR} \times (SLIP_{CTR}-SLIP_{RL}).$$

Steps 274 shown in FIG. 8 through 297 shown in FIG. 9 indicate a procedure of control for the respective hydraulic pressure control valves 13a, 13b, 13c, and 13d on the basis of the front and rear road wheel control hydraulic pressure required values $P_{PCTF}$ and $PP_{CTR}$. If $P_{PCTF}<PZ_{CTF}$ at the step 274, $TZ_{CTF}=TZ_{CT-1}+1$ and $TG_{CTF}=0$ at the step 275. If $TZ_{CTF}>TINT$ at the step 276, the hydraulic pressure increase output pulse=$P_{PCTF}\times PGAIN$ and $TZ_{CTF}=0$ at the step 277 and the output pressure increase pulse is outputted at the step 278.

If $P_{PCTF}\geq PZ_{CTF}$ at the step 274, the routine goes to the step 279 in which the CPU of the controller 8 determines whether $P_{PCTF}>PG_{CTF}$.

If YES at the step 279, $TG_{CTF}=T_{GCTF-1}+1$ and $TZ_{CTF}=0$ at the step 280.

If $P_{PCTF}\geq PZ_{CTF}$ at the step 274 and $P_{PCTF}\geq P_{GCTF}$ at the step 279, the routine goes to the step 284 in which $TZ_{CTF}=0$ and $TG_{CTF}=0$ at the step 285.

If $TG_{CTF}>TINT$ at the step 281, the pressure decrease output pulse is calculated at the step 282 as follows: $P_{PCTF}\times PGAIN$ and $TG_{CTF}=0$ and to the step 283.

If $TZ_{CTF}\geq TINT$ at the step 276 and $TG_{CTF}\leq TINT$ at the step 281, the routine goes to the step 285.

The steps 286 through 297 are generally the same as those at the steps 286 through 297 are generally the same as those at the steps 274 through 285 provided that the handling is related to the rear road wheels.

The hydraulic pressure control procedure on the respective wheel cylinders 20 are advanced in the same way as the steps 258 through 269 shown in FIG. 7.

The details will be omitted herein.

Consequently, when the CPU of the controller 8 determines that the understeer condition occurs, the braking force applied to the corresponding one of the front road wheels causes the drop in the vehicle speed so as to improve the traceability of the vehicle during the turning along a curved road and, furthermore, the braking force applied to the corresponding one of the rear left and right road wheels causes the development of the oversteer moment and improves a cornering force on the vehicle during the turning on the curved road.

Figure 10:
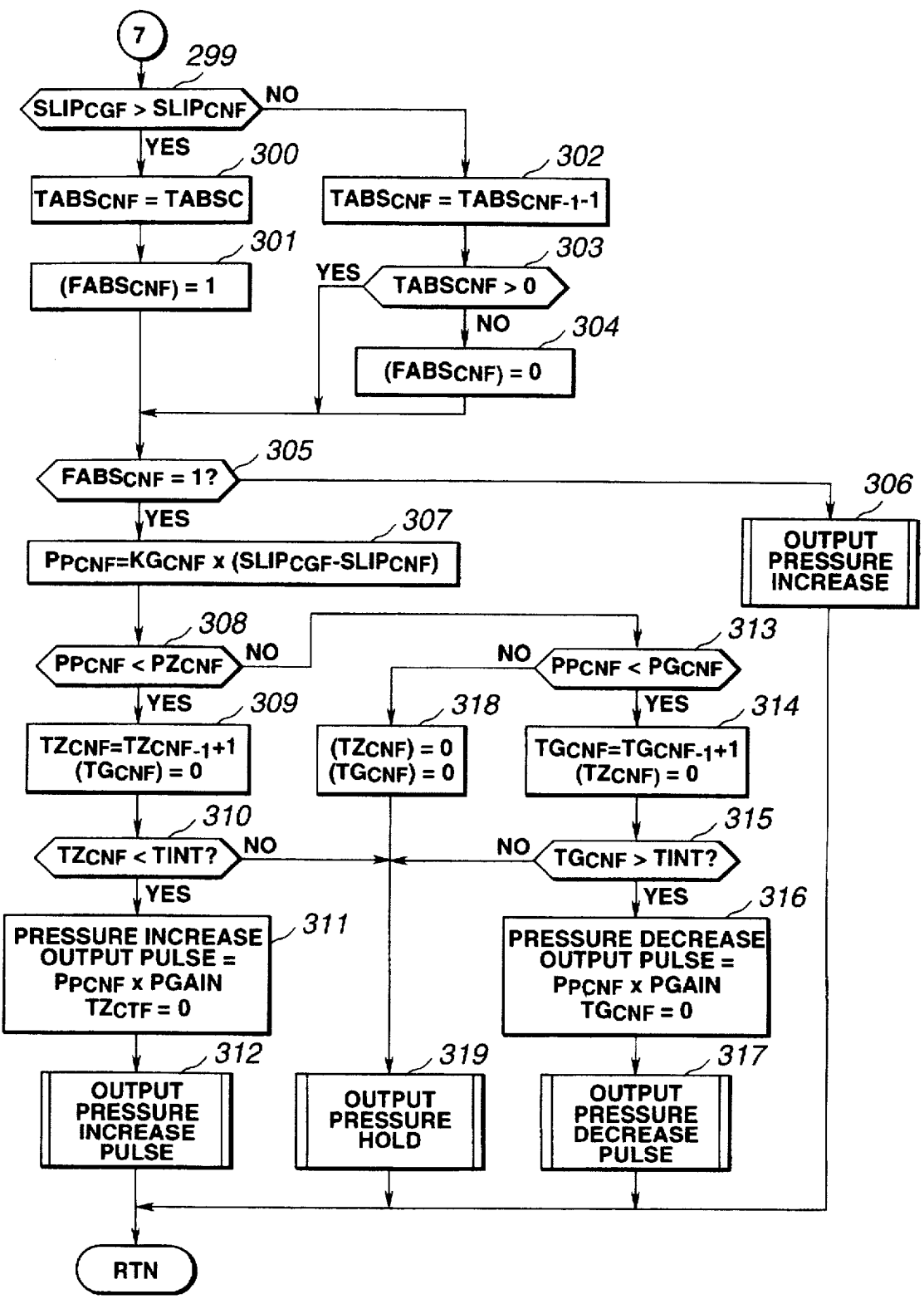

FIG. 10 shows a part of the routine in which the braking liquid pressure control in a case where one of the two separate braking pressure distribution conduits 21 and 22 through which the liquid pressure developed from the master cylinder 14 is supplied.

At a step 299, the CPU of the controller 8 determines whether the limit value of the slip rate SLIPCGF of one of the front left and right road wheels whose associated wheel cylinder 20 receives the braking liquid pressure supplied from the master cylinder 14 determined at the process Ⓐ or Ⓑ in the corresponding steps 214, 220, 235, or 221 exceeds the front road wheel slip rate $SLIP_{CnF}$ determined at the steps 211 and 222. If $SLIP_{CnF}<SLIP_{CGF}$(YES) at the step 299, the CPU of the controller 8 determines that it is necessary to reduce the braking force since the brake demand operated hydraulic pressure through the brake element supplied to the corresponding wheel cylinder 20 becomes equal to or larger than the process by which the limit value of the slip rate can be held and the routine goes to a step 300. At the step 300, a braking pressure decrease execution counter $TABS_{CnF}$ is set to a predetermined value TABS. At the subsequent step 301, a pressure decrease control flag $FABS_{CnF}$ is set to "1".

On the other hand, if the CPU of the controller 8 determines $SLIP_{CnF}$ $SLIP_{CGF}$ at the step 299 (NO), the routine goes to a step 302 in which the braking pressure decrease execution counter $TABS_{CnF}$ is decremented: $TABS_{CnF}=TABS_{CnF}-1$.

At the step 303, the CPU of the controller 8 determines whether $TABS_{CnF}>0$.

If $TABS_{CnF}\leq 0$ (NO) at the step 303, the CPU of the controller 8 determines that the front road wheel slip rate $SLIP_{CnF}$ exceeds the limit value of the front road wheel slip rate $SLIP_{CGF}$ and the slip rate $SLIP_{CnF}$ does not exceed the limit value of the slip rate $SLIP_{CGF}$ when the pressure increase control at steps 309 through 312 at the subsequent steps has been carried out even for a predetermined time duration and the CPU of the controller 8 determines that the braking liquid pressure derived from the master cylinder 14 is reduced with the vehicle driver released the brake element.

Hence, the routine goes to a step 304 in which a pressure decrease control flag $FABS_{CnF}$ is cleared as $FABS_{CnF}$ is zero at the step 303 (NO), the CPU of the controller 8 determines that the pressure increase carried out at the subsequent steps 309 through 312 is insufficient and it is not certain whether the brake demand operated liquid pressure in the master cylinder 14 is reduced with the vehicle driver released the brake element. Hence, the routine goes to a step 304 in which a pressure decrease control flag $FABS_{CnF}$ is cleared as $FABS_{CnF}=0$.

If the brake pressure decrease control execution counter $TABS_{CnF}$ is zero at the step 303 (NO), the CPU of the controller 8 determines that the pressure increase carried out at the subsequent steps 309 through 312 is insufficient and it is not certain whether the brake demand operated liquid pressure in the master cylinder 14 is reduced and the routine goes to a step 304 in which ($FABS_{CnF}$)=0.

The steps 299 through 304 causes the set or the clear of the pressure decrease execution flag $FABS_{CnF}$.

At the step 305, the CPU of the controller 8 determines whether the pressure decrease control flag $FABS_{CnF}=1$.

If $FABS_{CnF}=0$ (NO) at the step 305, the routine goes to a step 306 since the CPU of the controller 8 determines that the slip rate $SLIP_{CnF}$ falls within the limit value $SLIP_{CGF}$ of the slip rate eve if the braking demand operated liquid pressure in the master cylinder 14 is applied directly to the corresponding wheel cylinder 20. At the step 306, either the hydraulic pressure control valve 13a or 13b which corresponds to one of the road wheels of which the slip rate indicates $SLIP_{CnF}$ is in the pressure increase mode, namely, in a normal braking condition.

On the other hand, if $FABS_{CnF}$ is set to "1" at the step 306, the control of pressure decrease is executed at a step 307. At the step 307, the front road wheel control liquid pressure required value $P_{POnF}$ is determined by multiplying the difference between the limit value SLIPCGF of the slip rate and the slip rate $SLIP_{CnF}$ by the control gain $KG_{CnF}$.

According to the control at steps 308 through 319, the hydraulic pressure related to the front road wheel related wheel cylinder is controlled so that the slip rate $SLIP_{CnF}$ is not in excess of the limit value $SLIP_{CGF}$ of the slip rate.

The control procedure carried out at the steps 299 through 319 causes the reduction of the braking force so as to control the yaw moment in a case wherein the vehicle driver operates the brake element (for example, the brake pedal) during the control against the oversteer condition or the understeer condition and the slip rate $SLIP_{CnF}$ is below the limit value of the slip rate $SLIP_{CGF}$.

It is noted that although, in the embodiment, an example of the front road wheel on the corresponding one of the two braking pressure distribution conduits through which the liquid pressure developed in the master cylinder 14 is supplied, the same processed control is executed for the corresponding one of the rear left and right road wheels using the limit value $SLIP_{CGR}$ of the slip rate and the slip rate $SLIP_{CnR}$.

According to the control procedure shown in the part of the flowchart shown in FIG. 10, the braking liquid control on the conduit system through which the brake demand operated hydraulic pressure developed in the master cylinder 14 is supplied is carried out, a control balance caused by the brake control in the controller 8 being held at the balanced state.

Figure 11A:
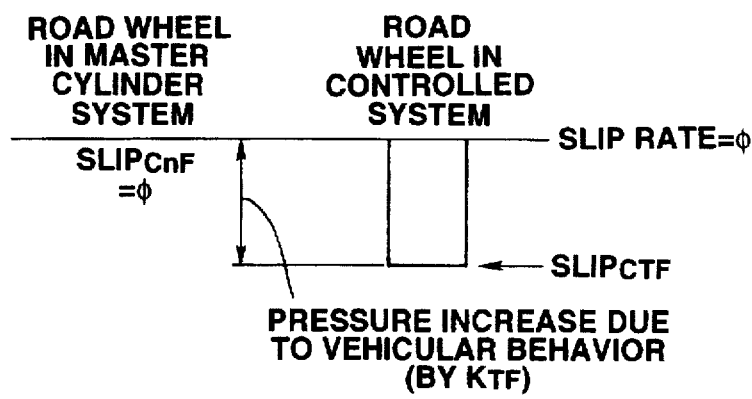
FIGS. 11A, 11B, and 11C are explanatory views for explaining an operation of the vehicle according to a result of execution in the flowchart shown in FIGS. 3 through 10.

As described in the embodiment, the vehicular attitude controller 8 determines the target value of the slip rate $SLIP_{CTF}$ so as to increase the braking liquid pressure by the value corresponding to the index $K_{FT}$ (i.e., by the vehicular behavior), as shown in FIG. 11A in order to obtain the braking force by which the yaw moment is suppressed during the oversteer condition or by which the yaw moment is developed and the corresponding hydraulic pressure to the target value is supplied only to either one of the two braking pressure distribution conduits 21 or 22 from the hydraulic pressure pump 13i.

Next, suppose that in a midway through the vehicular attitude control, the vehicle driver operates the brake element.

Figure 11B:
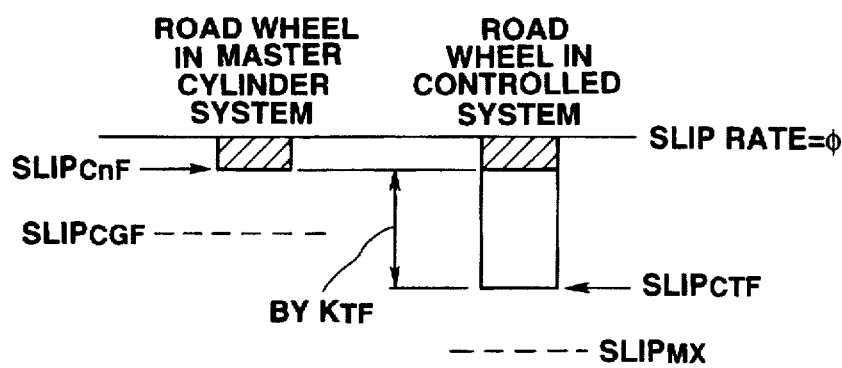

In this case, if this is a moderate braking operation, i.e., the braking operation is so moderate that the slip rate $SLIP_{CnF}$ on the one of the front road wheels is smaller than the corresponding limit value $SLIP_{CGF}$, as shown in FIG. 11B, the liquid pressure developed in the master cylinder 14 according to the braking operation is directly transmitted to one of the two braking pressure distribution conduit 21 or 22 through which the liquid pressure in the master cylinder 14 is supplied and the slip rate target value $SLIP_{CnF}$ is determined by the hydraulic pressure corresponding to the index KFT with the addition of that corresponding to the slip rate SLIPCnF in the other of the two braking pressure distribution conduits 21 or 22 through which the liquid pressure in the master cylinder 14 is supplied. In this case, the vehicular attitude is not disturbed since the balance in the liquid pressure between the two braking pressure distribution conduits is not varied.

Furthermore, suppose that the vehicle driver operates the brake element abruptly during the control against the oversteer or understeer condition, namely, the braking operation is so abrupt that the slip rate $SLIP_{CnF}$ is larger than the limit value of the slip rate $SLIP_{CGF}$.

Figure 11C:
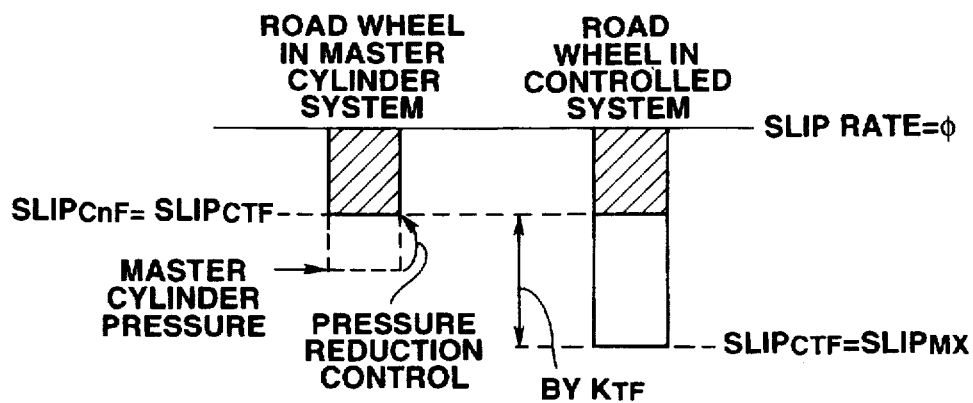

In this case, in order to prevent the slip rate $SLIP_{CnF}$ from being in excess of the limit value $SLIP_{CGF}$ of the corresponding slip rate, as shown in FIG. 11C, the controller 8 controls either the control valves 13a and 13b or the control valves 13b and 13c and is operated to take the balance between the braking liquid pressures in the two separate braking pressure distribution conduits 21 and 22 by additively supplying the hydraulic pressure in the control braking liquid conduit system. At this time, the yaw moment is optimally controlled so as to prevent the target value of the slip rate SLIPCTF from being in excess of a controllable maximum slip rate $SLIP_{MX}$.

In the vehicular attitude controlling apparatus and method according to the present invention, when the controller 8 determines that the vehicle presently falls in the oversteer condition exceeding the predetermined magnitude on the basis of the input detection signal of the vehicular behavior detector, the controller 8 executes such the oversteer avoidance control through the open and close of the interrupting valves 13e, 13f, 13g, and 13h that the hydraulic pressure from the hydraulic pressure pump 13i (control purpose liquid pressure source) is supplied to one of the two separate braking pressure distribution conduits 21 and 22 which provides a front road wheel braking force for one of the front left and right road wheels so as to suppress the yaw moment and the brake demand operated hydraulic pressure developed in the master cylinder is supplied to the other of the two separate braking pressure distribution conduits 21 and 22.

Figure 1A:
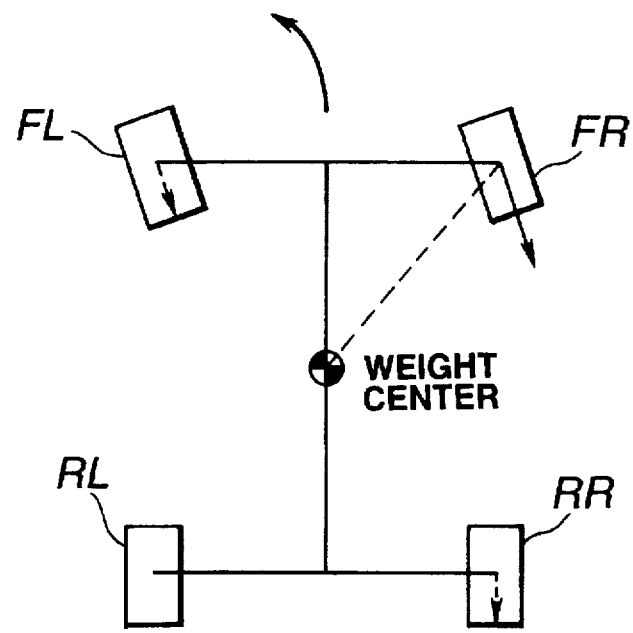
FIGS. 1A and 1B are explanatory views of a vehicle to which a vehicular attitude stability controlling apparatus according to the present invention is applicable for explaining an operation of the vehicular attitude stability controlling apparatus.

In details, as shown in FIG. 1A, when the oversteer condition occurs during the left turn of the vehicle as denoted by an arrow-marked solid line located at a top position of FIG. 1A, the braking force is given to the front right road wheel FR so as to reduce the oversteer moment to avoid the oversteer condition (the braking force applied to the front right road wheel FR acts upon the vehicle as a moment in the right turn direction with respect to the vehicle body. In addition, when the braking force is increased, a cornering force which has been acted upon the front right road wheel FR in the oversteer direction is reduced). In the case of the left turn oversteer condition, the interrupting valve 13e is opened, the interrupting valve 13f is closed, the interrupting valve 13g is closed and the interrupting valve 13h is opened so that the one 21 of the two separate braking pressure distribution conduits 21 and 22 receives the liquid pressure from the hydraulic pressure pump 13i and the other 22 of the braking pressure distribution conduits 21 and 22 receives the liquid pressure in the master cylinder 14. During this oversteer avoidance control, if the vehicle driver operates the brake element to issue the brake demand, the liquid pressure developed in the master cylinder 14 is supplied through the other 22 of the two separate braking pressure distribution conduits 21 and 22 to the wheel cylinders 20 arranged around the front left road wheel FL and the rear right road wheel RR so that the corresponding front left and rear right road wheels FL and RR are braked. Consequently, the braking force according to the driver's intention can be obtained.

On the other hand, when the controller 8 determines that the understeer exceeding the predetermined magnitude occurs on the basis of the input detection signal from the vehicular behavior detector, the controller 8 executes the understeer avoidance control through open and close of the four interrupting valves 13e, 13f, 13g, and 13h such that the liquid pressure from the hydraulic pressure pump 13i (control purpose liquid pressure supply) is supplied to one of the two separate braking pressure distribution conduits 21 and 22 which provides the braking force for one of the rear left and right road wheels in a direction such as to develop the yaw moment and the liquid pressure in the master cylinder 14 is supplied to the other of the two separate braking pressure distribution conduits 21 and 22.

Figure 1B:
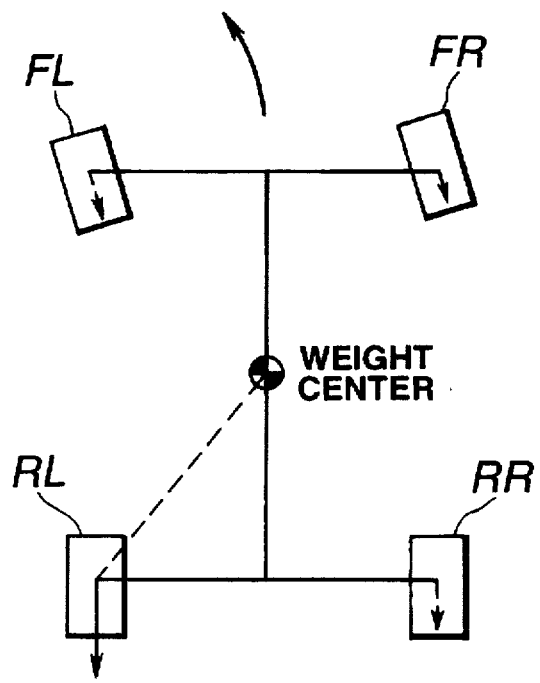

In details, when the understeer condition occurs during the left turn of the vehicle, as shown in FIG. 1B, the braking force is given to the rear left road wheel RL to develop the oversteer moment to avoid the recurrence of the understeer.

In this case, the interrupting valves 13e, 13f, 13g, and 13h are switched so that the liquid pressure from the control purpose liquid pressure source 13i is supplied to one of the two separate braking pressure distribution conduits 21 and 22 and the liquid pressure in the master cylinder 14 is supplied to the other 22 of the two separate braking pressure distribution conduits 21 and 22. During the understeer avoidance control, if the vehicle driver operates the brake element to issue the brake demand, the brake demand operated liquid pressure developed in the master cylinder 14 is transmitted to the other 22 of the two separate braking pressure distribution conduits 21 and 22 so that the wheel cylinders 20 arranged around the front left road wheel and around the rear right road wheel FL and RR are operated to brake the corresponding road wheels. Consequently, the braking force according to the driver's brake demand (driver's intention) can be obtained.

It is noted that in the cases of the oversteer condition during the right turn of the vehicle and the understeer condition during the right turn of the vehicle, the liquid pressure from the hydraulic pressure pump 13i is supplied through the other 22 of the two braking pressure distribution conduits 12 and 22 to the wheel cylinders arranged around the front left and rear right road wheels FL and RR and the liquid pressure in the master cylinder 14 is supplied through the one 21 of the two separate braking pressure distribution conduits 21 and 22 to the wheel cylinders 20 arranged around the front right road wheel FR and the rear left road wheel RL.

It is noted that the selector corresponds to the interrupting valves 13e, 13f, 13g, and 13h and the control valves 13a, 13b, 13c, and 13d correspond to the hydraulic pressure control valves (or interrupting valves).

What is claimed is:

1. An apparatus for a vehicle, comprising:
  a braking system having a master cylinder, a plurality of wheel cylinders, each of the wheel cylinders being arranged around a corresponding one of front left and right road wheels and rear left and right road wheels so as to apply a braking force to the corresponding one of the front left and right and rear left and right road wheels according to a braking liquid pressure supplied thereto, and two separate braking liquid pressure distribution conduits which are so arranged and constructed as to distribute the braking liquid pressure developed in the master cylinder according to a brake demand to the wheel cylinders arranged around the front right and the rear left road wheels and to the wheel cylinders arranged around the front left and rear right road wheels, respectively;
  a control purpose liquid pressure source which is so arranged and constructed as to enable an increase in the liquid pressure applied to each wheel cylinder independently of the liquid pressure in the master cylinder developed according to the brake demand;
  a selector which is so arranged and constructed as to selectively output a liquid pressure supply to the respective wheel cylinders from either the master cylinder or the control purpose liquid pressure source;
  a vehicular behavior detector which is so arranged and constructed as to detect a vehicular behavior; and
  a controller, having a first determinator determining whether an oversteer of the vehicle exceeding a predetermined magnitude occurs on the basis of an inputted signal indicating the vehicular behavior from the vehicular behavior detector, said controller carrying out an oversteer avoidance control via the selector such that the liquid pressure in the control purpose liquid pressure source is supplied to one of the braking pressure distribution conduits through which a braking force is applied to one of the front road wheels via the corresponding one of the wheel cylinders in a direction toward which a yaw moment is suppressed and the liquid pressure in the master cylinder is supplied to the other of the braking pressure distribution conduits, when the first determinator determines that the oversteer of the vehicle exceeding the predetermined magnitude occurs, wherein the controller further comprises a second determinator arranged for determining whether an understeer of the vehicle exceeding a predetermined magnitude of the understeer occurs on the basis of the inputted signal from the vehicular behavior detector, the controller carrying out an understeer avoidance control via the selector such that the liquid pressure in the control purpose liquid pressure source is supplied to one of the braking liquid pressure distribution conduits through which the braking force is applied to one of the rear road wheels in a direction toward which the yaw moment is developed and the liquid pressure in the master cylinder is supplied to the other of the braking pressure distribution conduits, when the second determinator determines that the understeer of the vehicle exceeding the predetermined magnitude occurs, wherein said selector comprises first interrupting valves, interposed between the control purpose liquid pressure source and each of the two braking pressure distribution conduits, which is enabled to interrupt the supply of the liquid pressure in the control purpose liquid pressure source to the corresponding one of the two braking pressure distribution conduits, and second interrupting valves, interposed between the master cylinder and each of the two braking pressure distribution conduits, which is enabled to interrupt the supply of the liquid pressure in the master cylinder to the corresponding one of the two braking pressure distribution conduits and wherein said controller opens or closes each of the first and second interrupting valves during the oversteer or understeer avoidance control, wherein the vehicular behavior detector detects a yaw rate of the vehicle and wherein the first determinator determines whether the oversteer of the vehicle exceeding the predetermined magnitude occurs on the basis of the yaw rate and the second determinator determines whether the understeer of the vehicle occurs on the basis of the yaw rate, and wherein said controller further comprises a third determinator arranged for determining a slip angle of the vehicle on the basis of at least the yaw rate and wherein said first determinator determines whether the oversteer of the vehicle exceeding the predetermined magnitude occurs on the basis of the slip angle of the vehicle and said second determinator determined whether the understeer of the vehicle exceeding the predetermined magnitude occurs on the basis of the slip angle of the vehicle.

2. An apparatus for a vehicle as claimed in claim 1, wherein said vehicular detector detects a lateral acceleration acted upon the vehicle and wherein said first determinator determines whether the oversteer of the vehicle occurs on the basis of the lateral acceleration and said second determinator determines whether the understeer of the vehicle exceeding the predetermined magnitude occurs on the basis of the lateral acceleration.

3. An apparatus for a vehicle as claimed in claim 2, wherein said vehicular behavior detector includes a steering angle sensor arranged on a vehicular steering system for detecting a steering angular velocity and a yaw rate sensor arranged for detecting a yaw rate and wherein said controller comprises a first calculator arranged for calculating a steering angular displacement on the basis of an output signal of the steering angle sensor, calculating a yaw rate target value on the basis of a calculated value of the steering angular displacement, calculating an absolute value of the actual yaw rate detected by the yaw rate sensor, calculating an absolute value of the yaw rate target value, and calculating a subtraction of the absolute value of the actual yaw rate value from the absolute value of the target yaw rate, and wherein said first determinator determines that the oversteer of the vehicle exceeding the predetermined magnitude occurs when the subtraction result of the first calculator indicates a positive value equal to or above a predetermined value.

4. An apparatus for a vehicle as claimed in claim 3, wherein said second determinator determines that the understeer of the vehicle exceeding the predetermined magnitude occurs when the subtraction result of the first calculator indicates a negative value below the predetermined value.

5. An apparatus for a vehicle as claimed in claim 2, wherein said vehicular behavior detector comprises a steering angle detector arranged on a vehicular steering system for detecting a steering angular velocity of the vehicular steering system; a yaw rate sensor arranged for detecting a yaw rate (YAW) of the vehicle; a lateral acceleration sensor arranged on a vehicle body for detecting a lateral acceleration ($Y_G$) acted upon the vehicle body and wherein said controller comprises a first calculator arranged for calculating a vehicle body slip angle (BETA) from the detected yaw rate (YAW), and the detected lateral acceleration ($Y_G$) and said controller comprises a second calculator arranged for calculating a steering angular displacement from the detected steering angular velocity, calculating a target value of the vehicle body slip angle calculated on the basis of the calculated steering angular displacement, calculating absolute values of the target value of the vehicle body slip angle and of the actual vehicle body slip angle, and calculating a subtraction of the absolute value of the actual vehicle body slip angle from the absolute value of the target value of the vehicle slip angle, and wherein said first determinator determines that the oversteer of the vehicle exceeding the predetermined magnitude occurs, when the subtraction result indicates a positive value equal to or above a predetermined value.

6. An apparatus for a vehicle as claimed in claim 5, wherein said second determinator determines that the understeer of the vehicle exceeding the predetermined magnitude occurs when the subtraction result indicates a negative value below the predetermined value.

7. An apparatus for a vehicle as claimed in claim 2, wherein said vehicular behavior detector comprises: a steering angle sensor arranged on a vehicular steering system for detecting a steering angular velocity; and a lateral acceleration sensor arranged on a vehicle body for detecting a lateral acceleration acted upon the vehicle body, wherein the controller comprises a first calculator arranged for calculating a steering angular displacement from the detected steering angular displacement from the detected steering angular velocity, a second calculator arranged for calculating a target value of the lateral acceleration on the basis of the calculated value of the vehicular steering angular displacement, calculating absolute values of both of the target value of the lateral acceleration and of the actual lateral acceleration detected by the lateral acceleration sensor, and calculating a subtraction of the absolute value of the actual lateral acceleration detected by the lateral acceleration sensor from the absolute value of the target value of the lateral acceleration, and wherein said controller comprises a first calculator arranged for calculating a steering angle displacement of the vehicular steering system from the detected steering angular velocity, and wherein said controller comprises a second calculator arranged for calculating a target value of the calculated steering angular displacement, calculating the slip angle on the basis of the detected yaw rate and the lateral acceleration and wherein said first determinator determines that the oversteer of the vehicle exceeding the predetermined value occurs when the subtraction result of the second calculator indicates a positive value equal to or above a predetermined value.

8. An apparatus for a vehicle as claimed in claim 7, wherein said second determinator determines that the understeer of the vehicle exceeding the predetermined magnitude occurs when the subtraction result indicates a negative value below the predetermined value.

9. An apparatus for a vehicle as claimed in claim 8, wherein said vehicular behavior detector comprises: a steering angle sensor arranged on a vehicular steering system for detecting a steering angular velocity of the vehicular steering system; a yaw rate sensor arranged for detecting a yaw rate of the vehicle; and a lateral acceleration sensor arranged for detecting a lateral acceleration acted upon the vehicle body, wherein said controller comprises a first calculator arranged for calculating a steering angular displacement from the detected steering angular velocity and a second calculator arranged for calculating a slip angle of the vehicle on the basis of the detected yaw rate and the detected lateral acceleration, calculating a target value of the slip angle on the basis of the calculated steering angular displacement and wherein said controller carries out the oversteer avoidance control when a subtraction result of the target value of the slip angle from the calculated slip angle indicates a value equal to or above a predetermined value.

10. An apparatus for a vehicle as claimed in claim 9, wherein said controller carries out the understeer avoidance control when the subtraction result of the second calculator indicates a value below the predetermined value.

11. An apparatus for a vehicle as claimed in claim 1, wherein 1 said braking system further comprises a plurality of control valves, each of which is interposed between the corresponding one of the wheel cylinders and the corresponding one of the two separate braking pressure distribution conduits and is enabled to control the liquid pressure to be supplied to the corresponding one of the wheel cylinders independently of the selector, and wherein said controller operates a corresponding one of the control valves so that the liquid pressure to be supplied to one of the wheel cylinders arranged around the rear road wheels via one of the two separate braking pressure distribution conduits through which the liquid pressure in the control purpose liquid pressure source is supplied is zeroed.

12. An apparatus for a vehicle as claimed in claim 1, wherein said vehicular behavior detector comprises a yaw rate sensor which is so arranged and constructed as to detect a yaw rate (YAW) of the vehicle, a plurality of road wheel speed sensors, each of which is so arranged and constructed as to detect a road wheel speed of a corresponding one of the front left and right and rear left and the rear left and right road wheels, a lateral acceleration sensor which is so arranged and constructed as to detect a lateral acceleration acted upon the vehicle body, and a steering angle sensor which is so arranged and constructed as to detect a steering angular velocity of a vehicular steering system, wherein said controller comprises a first calculator arranged for calculating a vehicle body speed (Vi) from among the detected road wheel speeds, a second calculator arranged for calculating a slip angle (BETA) of the vehicle body from the vehicle body speed ($Y_G$), and the detected yaw rate (YAW), a third calculator arranged for calculating a steering angular displacement according to the detected steering angular velocity and a fourth calculator arranged for calculating target values (YAWS, BETAS) of the yaw rate and the vehicle body slip angle on the basis of the steering angular displacement and the vehicle body speed, respectively, a fifth calculator arranged for calculating a correction index $K_{FT}$ for a vehicular attitude according to a following equation: $K_{FT}= K_1(YAWS-YAW)+K_2(BETAS-BETA)$, wherein $K_1$ and $k_2$ denote control gains, a sixth calculator arranged for calculating a slip rate of at least two front road wheels according to the following equation:

$SLIP_{FL}=(VW_{FL}-Vi)/Vi$, and $SLIP_{FR}=(VW_{FR}-Vi)/Vi$, wherein a subscript FL denotes the front the front left road wheel and a subscript FR denotes the front right road wheel, and a seventh calculator arranged for calculating a target value ($SLIP_{CTF}$) of one of the front road wheel slip rates of the front left and right road wheels on the corresponding one of the two separate braking pressure distribution conduits through which the braking liquid pressure in the control purpose liquid pressure source is supplied according to the following equation:

$SLIP_{CTF}=SLIP_{CnF}-K_{FM}\times SLIP_{CnR}+|K_{FT}\times SLIM/K_{FI}|$, wherein $SLIP_{CnF}$ denotes the slip rate of one of the front left and right road wheels on the corresponding one of the two separate braking pressure distribution conduits through which the braking liquid pressure in the control purpose liquid pressure source is supplied, $SLIP_{CnR}$ denotes the slip rate of one of the rear left and right road wheels on the corresponding one of the two separate braking pressure distribution conduits through which the braking liquid pressure in the master cylinder is supplied, Slim denotes a linearly varied road wheel slip rate, $K_{FM}$ denotes a characteristic constant on a vehicular front-and-rear weight distribution ratio, and $K_{FI}$ denotes a characteristic constant on a vehicular front road wheel weight and inertia, and wherein said controller during the oversteer avoidance control operates the corresponding one of the control valves so that the corresponding front road wheel slip rate of the front left or right road wheel on one of the two separate braking pressure distribution conduits through which the braking liquid pressure in the control purpose liquid pressure source is supplied is coincident with the target value ($SLIP_{CTF}$) of the corresponding slip rate.

13. An apparatus for a vehicle as claimed in claim 1, wherein said controller comprises an eighth calculator arranged for calculating rear road wheel slip rates as follows:

$SLIP_{RL}=(V_{WRL}-Vi)/Vi$, $SLIP_{RR}=(V_{WRR}-Vi)/Vi$, and a ninth calculator arranged for calculating slip rate limit rates ($SLIP_{CGF}$(front left or right road wheel), $SLIP_{CGR}$ (rear left or right road wheel)) of the road wheels on the corresponding one of the two separate braking pressure distribution conduits through which the liquid pressure in the master cylinder is supplied according to the following equation:

$SLIP_{CGF}=SLIP_{CGR}=|K_{FT}\times SLIP_{MX}-|Slim\times K_{FT}|/(K_{FI}-K_{RI})$, wherein KRI denotes a characteristic constant on a vehicular rear road wheel weight and inertia and $SLIP_{MX}$ denotes a control upper limit slip rate, and wherein said controller during the oversteer avoidance control operates each of the control valves disposed on the corresponding one of the two separate braking pressure distribution conduits through which the braking liquid pressure in the master cylinder is supplied so that the slip rates ($SLIP_{CnF}$ and $SLIP_{CnR}$) of the front and rear road wheels on the corresponding one of the two separate braking pressure distribution conduits through which the liquid pressure in the control purpose liquid pressure source is supplied do not exceed the slip rate limit values ($SLIP_{CGF}$ and $SLIP_{CGR}$).

14. An apparatus for a vehicle as claimed in claim 1, wherein said controller derives the correction index ($K_{FT}$) during the understeer avoidance control and derives the target value of the slip rate of the corresponding one of the front left and right road wheels on one of the two separate braking pressure distribution conduits through which the braking liquid pressure in the control purpose liquid pressure source is supplied is derived as a function of either (YAWS−YAW) or (BETAS−BETA) and, thereafter, limits the derived target value of the slip rate $SLIP_{CTF}$ so as to satisfy the following equation:

$SLIP_{CTF}<K_{FM}\times SLIP_{MX}+|K_{FT}\times Slim/K_{FI}|$.

15. An apparatus for a vehicle as claimed in claim 1, wherein said controller comprises a tenth calculator arranged for calculating a target value ($SLIP_{CTR}$) of the slip rate of one of the rear left and right road wheels on the corresponding one of the two separate braking liquid pressure distribution conduits through which the braking liquid pressure in the control purpose liquid pressure source is supplied according to the following equation: $SLIP_{CnR}=SLIP_{CnR}-K_{FM}(SLIP_{CnF}-SLIP_{CTF})-|K_{FT}\times Slim/K_{FI}|$ and wherein the slip rate of one of the rear road wheels on the corresponding one of the two braking pressure distribution conduits through which the braking liquid pressure in the control purpose braking liquid pressure source is supplied is coincident with the target value of the corresponding slip rate $SLIP_{CTR}$.

16. An apparatus for a vehicle as claimed in claim 15, wherein said controller comprises an eleventh calculator arranged for calculating slip rate limit values ($SLIPCGF$, $SLIPCGR$) of the front and rear road wheels on the corresponding one of the two separate braking pressure distribution conduits through which the braking liquid pressure in the master cylinder is supplied during the understeer avoidance control according to the following equation: $SLIP_{CGF}=SLIP_{CGR}=[K_{FI}\times SLIP_{CTF}-KRI\times SLIP_{MX}-|Slim\times K_{FT}|]/(K_{FI}-K_{RI})$ and wherein said controller operates the control valves so that the slip rates ($SLIP_{CnF}$, $SLIP_{CnR}$) of the front and rear road wheels on the corresponding one of the two separate distribution conduits do not exceed the corresponding slip rate limit values ($SLIP_{CGF}$, $SLIP_{CGR}$).

17. A method for stability controlling a vehicular attitude for a vehicle having front left and right and rear left and right road wheels (FL, FR, RL, and RR) and a brake system, the brake system including a master cylinder (14), a plurality of wheel cylinders (20) being arranged around a corresponding one of the front left and right road wheels so as to apply a braking force to the corresponding one of the front left and right and rear left and right road wheels according to a braking liquid pressure applied thereto, two separate braking pressure distribution conduits (21, 22) which are so arranged and constructed as to separately distribute a braking liquid pressure into the two of the wheel cylinders arranged around the front left and rear right road wheels and into the other two of the wheel cylinders arranged around the front left and rear right road wheels, respectively, and a control purpose liquid pressure source (13i) which is so arranged and constructed as to enable an increase in the liquid pressure to be applied to each wheel cylinder independently of the liquid pressure in the master cylinder, the method comprising the steps of:

a) detecting each road wheel speed of the front left and right road wheels (FL, FR, RL, and RR);

b) detecting a yaw rate (YAW) of the vehicle;

c) deriving a lateral acceleration ($Y_G$) acted upon the vehicle;

d) deriving a vehicle body speed (Vi) from the respective road wheel speeds;

23 e) deriving a slip angle (BETA) of the vehicle body to a vehicular forwarding direction on the basis of the detected yaw rate (YAW), the detected lateral acceleration ($Y_G$), and the derived vehicle body speed (Vi);

f) determining whether an oversteer exceeding a predetermined magnitude occurs on the basis of the determined slip angle;

g) switching a selector (13e, 13f, 13g, and 13h), the selector being arranged for selectively outputting the liquid pressure from either the master cylinder or the control purpose liquid pressure source through one of the two braking pressure distribution conduits to the wheel cylinders so that the liquid pressure from the control purpose liquid pressure source is supplied to one of the braking pressure distribution conduits through which a front road wheel braking force is given to the wheel cylinder arranged around one of the front left and right road wheels in a direction such as to suppress a yaw moment when determining that the oversteer exceeding the predetermined magnitude occurs.

18. A method for stability controlling a vehicular attitude for a vehicle as claimed in claim 17, which further comprises the steps of: h) determining whether an understeer exceeding a predetermined magnitude occurs on the basis of the derived slip angle; and i) switching the selector so that the liquid pressure in the control purpose liquid pressure source is supplied through one of the two braking pressure distribution conduits through which a rear road wheel braking force is given to the wheel cylinder arranged around one of the rear left and right road wheels in a direction such as to develop the yaw moment when determining that the understeer exceeding the predetermined magnitude occurs.

19. A method for stability controlling a vehicular attitude for a vehicle as claimed in claim 18, wherein the brake system further comprises a plurality of hydraulic pressure control valves (13a, 13b, 13c, and 13d) arranged in each of the two braking distribution conduits (21 and 22) for operatively controlling the supplied braking liquid pressure through the corresponding one of the two braking pressure distribution conduits to the corresponding one of the wheel cylinders, and which further comprises the step of: j) operating one of the hydraulic pressure control valves which is arranged in one of the two braking pressure distribution conduits through which the liquid pressure in the control purpose liquid pressure source is supplied to one of the wheel cylinders which is arranged around one of the rear left and right road wheels in the direction so as to suppress the yaw moment so that the liquid pressure supplied to the corresponding one of the wheel cylinders is zeroed when determining that the oversteer exceeding the predetermined magnitude occurs.

20. A method for stability controlling a vehicular attitude for a vehicle as claimed in claim 19, which further comprises the step of k) determining whether the vehicle Is turning in a leftward or rightward direction on the basis of the detected yaw rate when determining whether the oversteer exceeding the predetermined magnitude occurs or when determining whether the understeer exceeding the predetermined magnitude occurs.

21. A method for stability controlling a vehicular attitude for a vehicle having front left and right and rear left and right road wheels (FL, FR, RL, and RR) and a brake system, the brake system including a master cylinder, a plurality of wheel cylinders, each of the wheel cylinders being arranged around a corresponding one of the front left and right road wheels so as to apply a braking force to the corresponding one of the front left and right and rear left and right road wheels according to a braking liquid pressure applied thereto, two separate braking pressure distribution conduits which are so arranged and constructed as to separately distribute a braking liquid pressure into the two of the wheel cylinders arranged around the front left and rear right road wheels and into the other two of the wheel cylinders arranged around the front left and rear right road wheels, respectively, and a control purpose liquid pressure source which is so arranged and constructed as to enable an increase in the liquid pressure to be applied to each wheel cylinder independently of the liquid pressure in the master cylinder, the method comprising the steps of:

a) detecting each road wheel speed of the front left and right road wheels (FL, FR, RL, and RR);

b) detecting a yaw rate (YAW) of the vehicle;

c) deriving a lateral acceleration ($Y_G$) acted upon the vehicle;

d) deriving a vehicle body speed (Vi) from the respective road wheel speeds;

e) deriving a slip angle (BETA) of the vehicle body to a vehicular forwarding direction on the basis of the detected yaw rate (YAW), the detected lateral acceleration ($Y_G$), and the derived vehicle body speed (Vi);

f) determining whether an understeer exceeding a predetermined magnitude occurs on the basis of the determined slip angle;

g) switching a selector, the selector being arranged for selectively outputting the liquid pressure from either the master cylinder or the control purpose liquid pressure source through one of the two braking pressure distribution conduits to the wheel cylinders so that the liquid pressure from the control purpose liquid pressure source is supplied to one of the braking pressure distribution conduits through which a front road wheel braking force is given to the wheel cylinder arranged around one of the front left and right road wheels in a direction such as to develop a yaw moment when determining that the understeer exceeding the predetermined magnitude occurs.

* * * * *